United States Patent
Park et al.

(10) Patent No.: US 10,310,582 B2
(45) Date of Patent: Jun. 4, 2019

(54) DISPLAY APPARATUS AND CONTROL METHOD THEREOF

(71) Applicant: SAMSUNG ELECTRONICS CO., LTD., Suwon-si, Gyeonggi-do (KR)

(72) Inventors: Young-chan Park, Hwaseong-si (KR); Young-ho Choi, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 25 days.

(21) Appl. No.: 15/383,092

(22) Filed: Dec. 19, 2016

(65) Prior Publication Data
US 2017/0192486 A1   Jul. 6, 2017

(30) Foreign Application Priority Data

Jan. 5, 2016   (KR) .................. 10-2016-0001164

(51) Int. Cl.
*G06F 1/3231*   (2019.01)
*G06F 1/3234*   (2019.01)
(Continued)

(52) U.S. Cl.
CPC ............ *G06F 1/3231* (2013.01); *G06F 1/263* (2013.01); *G06F 1/3234* (2013.01);
(Continued)

(58) Field of Classification Search
CPC ...... G06F 1/3231; G06F 1/3234; G06F 1/263; G06F 3/2092; G06F 1/3265
See application file for complete search history.

(56) References Cited

U.S. PATENT DOCUMENTS 6,498,460 B1    12/2002  Atkinson
7,489,297 B2 *  2/2009   Hohmann .............. G06F 3/043
                                                345/156
(Continued)

FOREIGN PATENT DOCUMENTS

CN    202615757 U  * 12/2012
CN    105472170 A  *  4/2016
(Continued)

OTHER PUBLICATIONS

Search Report dated Apr. 13, 2017 in counterpart International Patent Application No. PCT/KR2016/015120.
(Continued)

*Primary Examiner* — Ricardo Osorio
(74) *Attorney, Agent, or Firm* — Nixon & Vanderhye P.C.

(57) ABSTRACT

Disclosed is a display apparatus including: a wireless power receiver configured to wirelessly receive power from an external power source to supply power to the display apparatus; a display configured to display an image based on a received image signal; communication circuitry configured to communicate with the external module; information acquiring circuitry configured to acquire information about a distance between the display apparatus and a user; and a controller configured to determine consumption power of the display apparatus, to control the communication circuitry to provide information about the determined consumption power to the external module, and to reduce the consumption power of the display apparatus if it is determined based on the acquired information that the user is within a predetermined critical distance of the display apparatus. Thus electromagnetic waves harmful to a human body is controlled to reduce and/or eliminate an affect a user.

20 Claims, 17 Drawing Sheets

(51) Int. Cl.
*G06F 1/26* (2006.01)
*G09G 3/20* (2006.01)
*H02J 7/02* (2016.01)
*H04B 5/00* (2006.01)
*H02J 50/10* (2016.01)
*H02J 50/80* (2016.01)
*G06F 3/0482* (2013.01)
*G06F 3/16* (2006.01)

(52) U.S. Cl.
CPC .......... *G06F 1/3265* (2013.01); *G06F 1/3278* (2013.01); *G09G 3/2092* (2013.01); *H02J 7/025* (2013.01); *H02J 50/10* (2016.02); *H02J 50/80* (2016.02); *H04B 5/0031* (2013.01); *H04B 5/0037* (2013.01); *H04B 5/0075* (2013.01); *G06F 3/0482* (2013.01); *G06F 3/16* (2013.01); *G09G 2320/0626* (2013.01); *G09G 2320/08* (2013.01); *G09G 2330/021* (2013.01); *G09G 2330/06* (2013.01); *G09G 2354/00* (2013.01); *G09G 2370/16* (2013.01); *Y02D 10/153* (2018.01); *Y02D 10/157* (2018.01); *Y02D 10/173* (2018.01)

(56) References Cited

U.S. PATENT DOCUMENTS

| | | | | |
|---|---|---|---|---|
| 9,236,757 | B2* | 1/2016 | Walley | H02J 5/005 |
| 9,304,379 | B1* | 4/2016 | Wang | H04N 9/3182 |
| 9,906,275 | B2* | 2/2018 | Leabman | H04B 5/0037 |
| 2006/0020981 | A1 | 1/2006 | Paik | |
| 2007/0007821 | A1* | 1/2007 | Rossetti | H02J 17/00 |
| | | | | 307/22 |
| 2009/0109235 | A1* | 4/2009 | Lin | G02B 7/36 |
| | | | | 345/589 |
| 2010/0050005 | A1* | 2/2010 | Fujiwara | H04N 5/63 |
| | | | | 713/320 |
| 2010/0109445 | A1* | 5/2010 | Kurs | B60L 11/007 |
| | | | | 307/104 |
| 2011/0193838 | A1* | 8/2011 | Hsu | G09G 5/00 |
| | | | | 345/207 |
| 2012/0127325 | A1* | 5/2012 | Lai | G06F 3/011 |
| | | | | 348/207.1 |
| 2013/0082651 | A1* | 4/2013 | Park | H02J 7/025 |
| | | | | 320/108 |
| 2013/0082991 | A1* | 4/2013 | Lin | G09G 5/00 |
| | | | | 345/207 |
| 2013/0114043 | A1* | 5/2013 | Balan | G02B 27/017 |
| | | | | 351/210 |
| 2013/0172045 | A1 | 7/2013 | Caballero | |
| 2014/0344608 | A1 | 11/2014 | Wang | |
| 2015/0356714 | A1* | 12/2015 | Moalem | G06T 5/003 |
| | | | | 345/207 |
| 2016/0062455 | A1* | 3/2016 | Chiang | G06F 3/013 |
| | | | | 345/619 |
| 2016/0195916 | A1* | 7/2016 | Shiozaki | G06F 1/3265 |
| | | | | 348/333.13 |
| 2016/0246364 | A1* | 8/2016 | Miller | G09G 5/00 |
| 2016/0268833 | A1* | 9/2016 | Lee | H02J 50/80 |
| 2016/0293140 | A1* | 10/2016 | Li | G09G 5/10 |
| 2016/0300547 | A1* | 10/2016 | El-Rukby | H02J 50/80 |
| 2016/0349543 | A1* | 12/2016 | Rogers | G02F 1/0128 |
| 2017/0046815 | A1* | 2/2017 | Wang | G06T 3/40 |
| 2017/0140712 | A1* | 5/2017 | Yu | G09G 3/36 |
| 2017/0164278 | A1* | 6/2017 | Fang | H04W 52/027 |
| 2017/0200427 | A1* | 7/2017 | He | G09G 5/006 |
| 2017/0329399 | A1* | 11/2017 | Azam | G06F 3/013 |
| 2018/0199104 | A1* | 7/2018 | Park | H04N 21/8146 |

FOREIGN PATENT DOCUMENTS

| | | | | |
|---|---|---|---|---|
| CN | 205247578 | U * | 5/2016 | |
| CN | 105677089 | A * | 6/2016 | ........... G06F 3/0416 |
| CN | 106409271 | A * | 2/2017 | |
| EP | 2 793 355 | | 10/2014 | |
| JP | 2006-013938 | | 1/2006 | |
| KR | 10-2013-0035905 | | 4/2013 | |
| KR | 10-2013-0068921 | | 6/2013 | |
| KR | 10-2015-0104284 | | 9/2015 | |

OTHER PUBLICATIONS

Partial Supplementary EP Search Report for EP Application No. 16884029.6 dated Jul. 27, 2018.

Kim et al., "Advanced Power Control Scheme in Wireless Power Transmission for Human Protection from EM Field", IEEE Transactions on Microwave Theory and Techniques, vol. 63, No. 3, Mar. 2015.

European Extended Search Report for EP Application No. 16884029.6 dated Oct. 23, 2018.

* cited by examiner

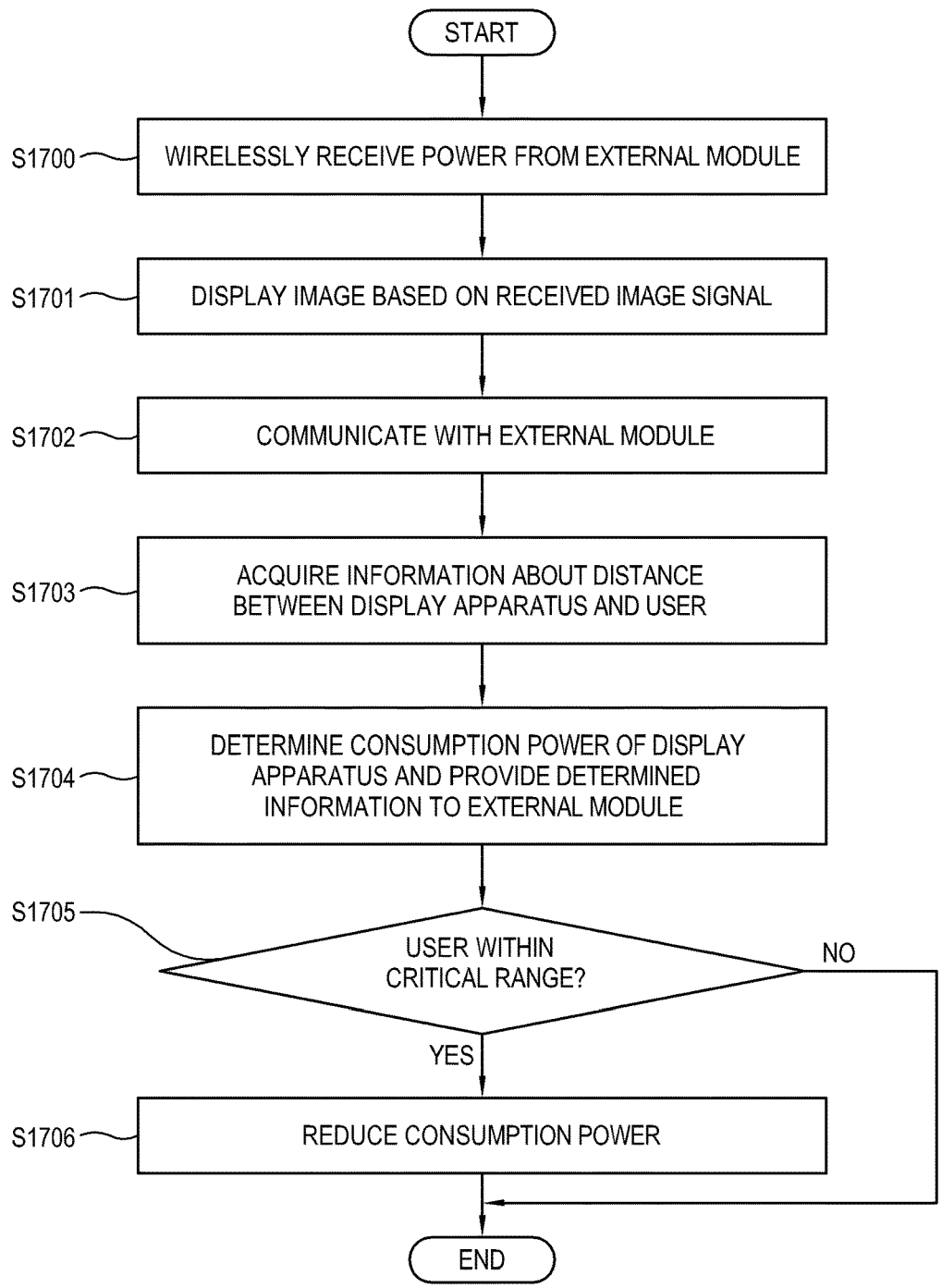

DISPLAY APPARATUS AND CONTROL METHOD THEREOF

CROSS-REFERENCE TO RELATED APPLICATION

This application is based on and claims priority under 35 U.S.C. § 119 to Korean Patent Application No. 10-2016-0001164, filed on Jan. 5, 2016 in the Korean Intellectual Property Office, the disclosure of which is incorporated by reference herein in its entirety.

BACKGROUND

Field

The present disclosure relates generally to a display apparatus capable of wirelessly receiving power, and for example, to a display apparatus and a control method thereof, in which the amount of power to be wirelessly transferred is temporarily decreased to protect a user if the user comes within a predetermined range while wirelessly receiving power.

Description of Related Art

With development of information technology (IT), many technologies have been proposed to supply power to various electronic products. In particular, a wireless power transmission technology has been developed and used for wirelessly supplying power without physical contact between devices as opposed to the existing electronic devices of using a wire to receive electric energy or power. The electronic device capable of wirelessly receiving power may operate with the received power.

By the wireless power transmission technology, power supply is possible anywhere and anytime without using a power line such as an electric wire. Thus, it is expected that the wireless power transmission technology combines with various industrial fields such as wireless charging for a mobile device, wireless power supply for home appliances, charging for electric vehicles, a wireless sensor for Internet-of-things IOT), etc. and promotes innovation for future society.

As a method of wirelessly supplying power, there are a magnetic induction method, a magnetic resonance method and an electromagnetic-wave method. The Wireless Power Consortium has released the standards for the wireless power transmission technology using the magnetic induction method among the above methods. The standards of the Wireless Power Consortium specify the method of transmitting power by the magnetic induction method.

However, a strong magnetic field may be generated in the vicinity of a power supplying apparatus and a power receiving apparatus during wireless transmission of the power, and may be harmful to a user if s/he gets too close to it. In this regard, the International Commission on Non-Ionizing Radiation Protection (ICNIRP) has determined and notified an allowable exposure limit to electromagnetic waves from products in order to protect a human body from non-ionizing radiation, and this allowable exposure limit has been used as recommended standards or general international standards. Based on the ICNIRP standards, the public is restricted to be exposed to an electric field of $8.3*10-2$ (kV/m), a magnetic field of $21(A/m)$ and a magnetic flux density of $2.7*10-5(T)$ for about 6 minutes since a frequency band of 200~300 KHz is used in the wireless power transmission. The ICNIRP has established the exposure limits for the public, who does not realize and takes no measure to the exposure to electromagnetic fields, more strictly than those for workers, who typically recognize the exposure of electromagnetic waves and are aware of potential risks.

The exposure to the electromagnetic waves has been restricted for a human body all over the world, and therefore users of a display apparatus wirelessly receiving power to display an image also need to be protected from electromagnetic waves radiated between the wireless power supplying apparatus and the wireless power receiving apparatus.

Conventionally, a wireless power transmission side has measured a distance from a user in order to protect him/her or has ceased transmitting the power if a user comes between the transmitting side and a receiving side. Thus, there is a problem that a user is not effectively protected since the receiving side does not offer any information and only the transmitting side performs unilateral determination and control.

SUMMARY

An example aspect of one or more example embodiments may provide a display apparatus and a control method thereof, in which electromagnetic waves harmful to a human body are controlled not to affect a user even though he/she may be close to the display apparatus that operates by wirelessly receiving power.

According to an example aspect of an example embodiment, a display apparatus is provided including: a wireless power receiver configured to wirelessly receive power from an external power source; a display configured to display an image based on a received image signal; a first communicator comprising communication circuitry configured to communicate with the external power source; an information acquirer comprising information acquiring circuitry configured to acquire information about a distance between the display apparatus and a user; and a controller configured to determine consumption power of the display apparatus, to control the communication circuitry of the first communicator to provide information about the determined consumption power to the external power source, and to control the display apparatus to reduce the consumption power of the display apparatus if it is determined based on the acquired information that the user is within a critical predetermined distance of the display apparatus.

The controller may detect data based on change in a level of power transmitted from the external power source, and control the display to display an image based on the detected data.

The controller may control at least one among brightness of the display, a sound output from a loudspeaker, and quality of an image displayed on the display to reduce the consumption power of the display apparatus.

The display apparatus may further include a battery provided in the display apparatus to selectively supply power to the display apparatus, and the controller may charge the battery with some of power supplied from the wireless power receiver, control the first communicator to request to the external power source to cut off the power transmission from the external power source if it is determined based on the acquired information that the user is within the critical predetermined distance, and control the battery to supply power if the wireless power receiver does not power from the external power source.

The controller may perform the control operation for reducing the consumption power if a preset first critical time is over after it is determined based on the acquired information that a body part of the user comes within the critical range.

The controller may determine whether the user is moving or not within the critical predetermined distance based on the acquired information, and perform the control operation for reducing the consumption power if it is determined that the user is moving and the movement lasts for more than a second critical time.

The controller may determine whether the user is moving away from the display apparatus in a first direction or not moving away from the display apparatus in a second direction if it is determined based on the acquired information that the user is moving, and perform the control operation for reducing the consumption power if the user is moving in the second direction and the movement lasts for more than a third critical time.

The controller may perform the control operation for reducing the consumption power based on distances between the user and the display apparatus based on the acquired information.

The controller may control the display to display a distance between the user and the display apparatus based on the acquired information.

The controller may control the display to display a user interface (UI) including at least one menu item, store setup information about the consumption power based on inputs received using the menu item of the user interface, and perform the control operation for reducing the consumption power based on the stored setup information.

According to an example aspect of an example embodiment, a method of controlling a display apparatus is provided, the method including: wirelessly receiving power from an external power source; displaying an image based on a received image signal; communicating with the external power source; acquiring information about a distance between the display apparatus and a user; determining consumption power of the display apparatus and providing information about the determined consumption power to the external power source; and performing a control operation for reducing the consumption power of the display apparatus if it is determined based on the acquired information that the user is within a predetermined critical distance from the display apparatus.

The wirelessly receiving the power may include: detecting data based on change in a level of power transmitted from the external power source, and displaying an image based on the detected data.

The performing a control operation for reducing the consumption power of the display apparatus may include: controlling at least one among brightness of a display, a sound output from a loudspeaker, and quality of an image displayed on the display.

The method may further include: charging a battery with some of power received from the external power source; and making a request to the external power source to cut off the power transmission of the external power source if it is determined based on the acquired information that the user is within the critical predetermined distance, and controlling the battery to selectively supply power if no power is received from the external power source.

The performing a control operation for reducing the consumption power of the display apparatus may include: performing the control operation for reducing the consumption power if a preset first critical time is over after it is determined based on the acquired information that a body part of the user comes within the critical predetermined distance.

The performing a control operation for reducing the consumption power of the display apparatus may include: determining whether the user is moving or not; and performing the control operation for reducing the consumption power if it is determined that the user is moving and the movement lasts for more than a second critical time.

The performing a control operation for reducing the consumption power of the display apparatus may include: determining whether the user is moving away from the display apparatus in a first direction or not moving away from the display apparatus in a second direction if it is determined that the user is moving; and performing the control operation for reducing the consumption power if the user is moving in the second direction and the movement lasts for more than a third critical time.

The performing a control operation for reducing the consumption power of the display apparatus may include: performing the control operation for reducing the consumption power based on distances between the user and the display apparatus based on the acquired information.

The method may further include: displaying a distance between the user and the display apparatus based on the acquired information.

The method may further include: displaying a user interface (UI) including at least one menu item; storing setup information about the consumption power in based on inputs received using the menu item of the user interface; and performing the control operation for reducing the consumption power based on the stored setup information.

BRIEF DESCRIPTION OF THE DRAWINGS

The above and/or other aspects, features and attendant advantages will become more apparent and more readily appreciated from the following detailed description, taken in conjunction with the accompanying drawings, in which like reference numerals refer to like elements, and wherein:

FIG. 17 is a flowchart illustrating an example of controlling a display apparatus according to an example embodiment.

DETAILED DESCRIPTION

Figure 1:
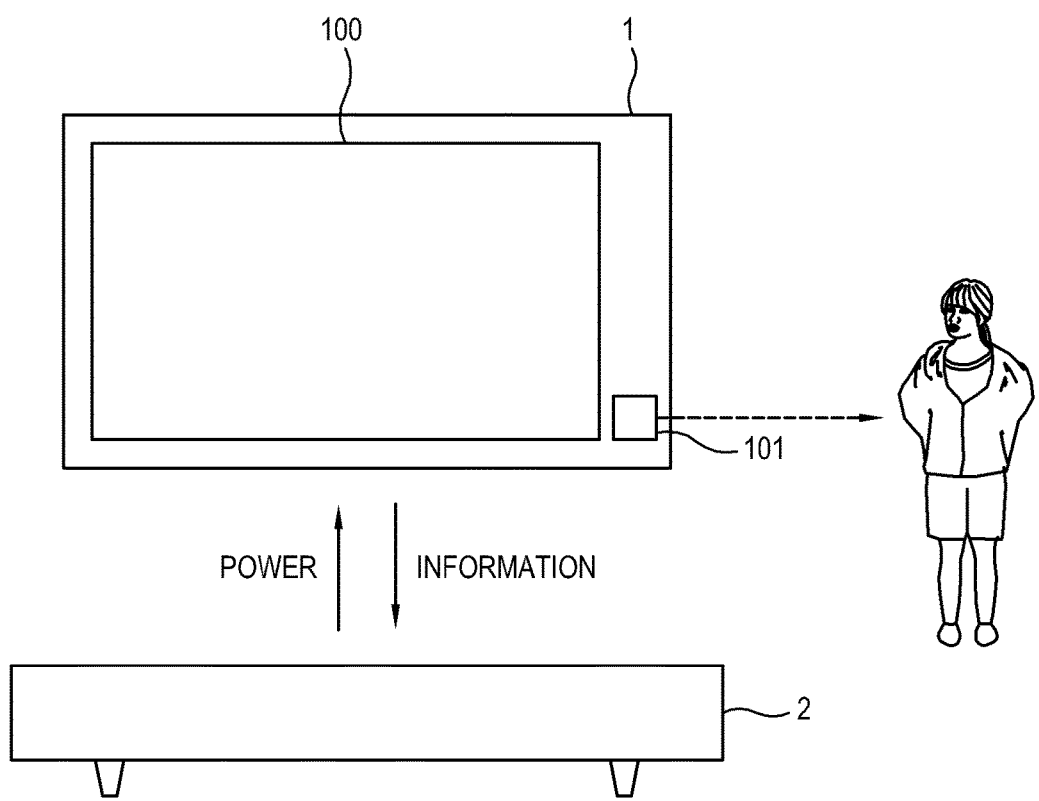
FIG. 1 is a diagram illustrating an example of a display apparatus according to an example embodiment.

Below, various example embodiments will be described in greater detail with reference to accompanying drawings. However, detailed descriptions about publicly known functions or elements, which may cloud the gist of the present disclosure may be omitted in the following description and accompanying drawings. If possible, like numerals refer to like elements throughout the accompanying drawings.

Terms or words used in the present disclosure and the appended claims set forth herein shall be construed as not typical or lexical acceptation but a meaning matching with the present disclosure on the principle that the disclosure can properly define terms for the best way to describe the various example embodiments of the disclosure. Therefore, example embodiments described in the present disclosure and features illustrated in the accompanying drawings are merely examples without representing all the present concepts, and it is thus appreciated that various equivalents and modifications can be made as alternatives at the time of the present disclosure.

In the accompanying drawings, some elements are exaggerated, omitted or schematically illustrated, in which the size of each element may not reflect the real size thereof. Therefore, the present disclosure is not limited by the relative sizes or spaces illustrated in the accompanying drawings.

Throughout the disclosure, if a certain element 'includes' an additional element, it may refer to a situation in which the certain element does not exclude the other elements but further includes the additional element unless otherwise noted. Further, a '~portion' used in this disclosure may, for example, refer to a dedicated processor, a CPU, field-programmable gate array (FPGA) or the like software, or an application-specific integrated circuit (ASIC) or the like hardware element, in which the '~portion' is configured to perform a specific function. However, the '~portion' is not restrictively construed as software or hardware. The '~portion' may be configured in a storage medium to be addressed, or may be configured to reproduce one or more processors. For example, the '~portion' may include software elements, object-oriented software elements, class elements, task elements and the like elements, and may include processes, functions, attributes, procedures, subroutines, segments of a program code, drivers, firmware, a microcode, a circuit, data, a database, data structures, tables, arrays and variables. The functions provided in the elements and '~portions' may be combined into fewer elements and portions', or may be further divided into more elements and '~portions.'

Below, example embodiments will be described in greater detail with reference to accompanying drawings so as to be understood by a person having an ordinary skill in the art. The present disclosure may be embodied in many different forms, and not limited to the following example embodiments. Portions unrelated to the descriptions may be omitted for clarity, and like numerals refer to like elements throughout.

In the present disclosure, a display apparatus is configured to wirelessly receive power from an external apparatus and provide an image based on a received image signal.

In the present disclosure, the external apparatus (e.g., including an external power source) is configured to receive external power by a wire, and wirelessly supply power to the display apparatus by the publicly known wireless power transmission method, which may be achieved by an external wireless power supply module/source. Further, the external apparatus may be configured to receive an image signal and provide the received image signal to the display apparatus, in which the image signal may be transmitted through Bluetooth or the like communication or may be embedded in the power to be transmitted.

In the present disclosure, the magnetic induction method may refer, for example, to a method of transmitting power to a magnetically coupled electronic apparatus through electromagnetic induction between coils, and the magnetic resonance method may refer, for example, to a method of using magnetic moment in an electromagnetic field to transmit power to an electronic apparatus having a unique frequency. Further, the electromagnetic-wave method may refer, for example, to a method of transmitting power in the form of electromagnetic waves through an antenna or the like.

FIG. 1 is a diagram illustrating an example of using a display apparatus according to an example embodiment.

According to an example embodiment, a display apparatus 1 is configured to wirelessly receive power from an external apparatus 2 and display an image. The display apparatus 1 may receive power needed for operations from the external apparatus 2, determine power to be consumed or being consumed, analyze an efficiency of wireless power transmission based on information about the received power, and provide information about the external apparatus 2. Thus, the external apparatus 2 may wirelessly transmit power to the display apparatus 1 with an optimum and/or improved efficiency based on the information about the power to be consumed and the efficiency of the wireless power transmission. The external apparatus may include an external power source. The term external power source may be used interchangeably with the term external power supply. The external power source or external power supply of the external apparatus may be configured to wirelessly provide power to the display apparatus. Further, the display apparatus 1 may further include a sensor for sensing a nearby human body or sensing a distance from the human body, or an information acquirer 101 for acquiring relevant information from an external sensor. The information acquirer 101 may include various information acquiring circuitry configured to generate information about whether a user keeps a certain distance from the display apparatus 1 or how far a user is located from the display apparatus 1. Further, the display apparatus 1 may transmit relevant information to decrease or cut off power transmission from the external apparatus 2 based, for example, on a distance from a user, a time for which a user stays, whether a user moves, which direction a user moves in, etc. To decrease the power transmission from the external apparatus 2, the display apparatus 1 may reduce the consumption power and thus warn that necessary power is low. Further, the display apparatus 1 may include a battery configured to be wirelessly charged, and may be configured to make a request for cutting off the power transmission to the external apparatus 2 if a user comes within a predetermined distance, and to operate by receiving driving power from the battery.

The external apparatus 2 receives power through a power line connected to the exterior and supplies power to the display apparatus 1. The external apparatus 2 may be configured to receive information about the consumption power of the display apparatus 1 and the wireless power transmission efficiency through a communicator (e.g., including communication circuitry) 201 (see, e.g., FIG. 2), and perform conversion for lowering or raising power being supplied as much as required by the display apparatus 1, based on the received information. In an example embodiment, the external apparatus 2 is provided separately from the display apparatus 1. Alternatively, the external apparatus 2 according to an example embodiment may be provided as an external module of the display apparatus 1 and offer power, an image signal or the like to the display apparatus 1. For example, the external apparatus 2 may be achieved by a set-top box or the like that receives and processes a broadcast signal, a cable signal, etc. and offers image information to a television (TV).

Below, the apparatus for supplying power to the display apparatus in this disclosure will be described as the external module 2. However, this shall be not construed as excluding the external apparatus 2 independent of the display apparatus 1 from the scope of the present disclosure.

Figure 2:
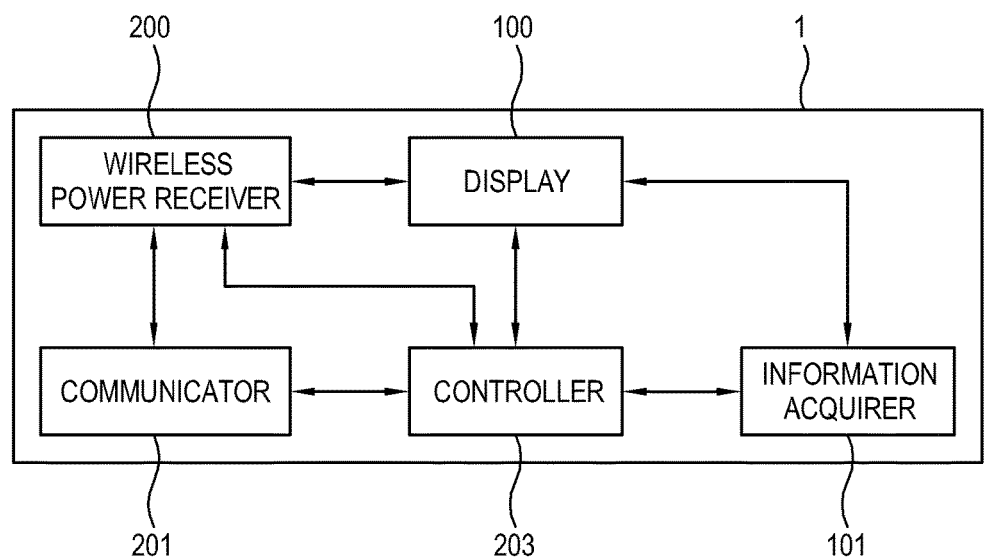
FIG. 2 is a block diagram illustrating an example display apparatus according to an example embodiment.

FIG. 2 is a block diagram illustrating an example display apparatus according to an example embodiment.

The display apparatus 1 according to an example embodiment may be driven by wirelessly receiving power from the external module 2. The display apparatus 1 may be configured to display an image based on a received image signal and to reduce consumption power based on distances from a user. To this end, the display apparatus 1 according to an example embodiment may include a wireless power receiver (e.g., including wireless power receiving circuitry) 200, a display 100, the communicator (e.g., including communication circuitry) 201, the information acquirer (e.g., including information acquiring circuitry) 101 and a controller (e.g., including processing circuitry) 203. The display apparatus 1 may be achieved various multimedia apparatuses for showing a user an image based on an image signal, such as a tablet computer, a smart phone, a personal digital assistant (PDA), a portable multimedia player (PMP), etc. as well as a monitor and a TV of offering an image, or the like, but is not limited thereto.

The wireless power receiver 200 may include various circuitry configured to receive wireless power from the external module 2 and to supply power to the elements of the display apparatus 1. In order to wirelessly receive power from the external module 2, the wireless power receiver 200 may include various circuitry configured to use one or more among a magnetic induction method, which employs inductive coupling based on electromagnetic induction caused by a wireless power signal, a magnetic resonance method, which employs electromagnetic resonance coupling based on electromagnetic resonance caused by a wireless power signal having a specific frequency, and an electromagnetic-wave method, which transmits and receives electromagnetic waves including electric energy. The wireless power transmission based on the magnetic induction method employs a primary coil at a transmitting side and a secondary coil at a receiving side, in which a varying magnetic field generated in a coil causes an electric current to be induced in the other coil by an electromagnetic induction phenomenon, thereby transmitting the power.

The magnetic resonance method may refer, for example, to that a wireless power signal transmitted from the external module 2 causes an electromagnetic resonance to be generated in the wireless power receiver 200 of the display apparatus 1 and induce an electric current in the display apparatus 1, thereby transmitting power. The wireless power receiver 200 may use one or more among the foregoing magnetic induction, magnetic resonance and electromagnetic-wave methods to wirelessly receive power from the external module 2, and therefore includes a power receiver and a converter.

For convenience of description, it will be described below that the power is wirelessly transmitted between the wireless power receiver 200 and the external apparatus 2 by the magnetic induction method, but this shall be not construed as excluding the other wireless power transmission methods from the scope of the present disclosure.

The display 100 is configured to display an image based on an image signal under control of the controller 203. The display 100 includes a display panel on which an image is displayed, may optionally include a backlight unit used as a light source for emitting light to the display panel, and a driver for driving the display panel and the optional light source by supplying power. If the display panel is a non-emissive element, light from the light source is needed to display an image. On the other hand, if the display panel is a self-emissive element, a driving circuit may directly supply power to the self-emissive element of the display panel. For convenience of description, the display panel in this example embodiment is the non-emissive element, but not limited thereto. The light source, which emits light to the display panel, consumes most of power to be consumed in the display 100. Therefore, the controller 203 may control the light source to lower the emitted light in order to reduce the consumption power.

Further, the display apparatus 1 may include a loudspeaker (not shown) for making a sound or voice corresponding to an image displayed on the display 100. The loudspeaker may be provided in the display apparatus 1 or may be achieved by an external apparatus connected by wired/wireless communication.

The communicator 201 may include various communication circuitry configured to enable the display apparatus 1 to communicate with the exterior. For example, the communicator 201 may be configured to communicate with not only the external module 2 for providing power but also other external apparatuses, a network or the like, and include a plurality of connection ports corresponding to various standards such as high definition multimedia interface (HDMI), a universal serial bus (USB), etc. The communicator 201 may perform wired communication with a plurality of servers through a wired local area network (WLAN). Further, the communication performed by the communicator 201 may include wireless communication. The communicator 201 may include a radio frequency (RF) circuit for transmitting/receiving an RF signal to perform one or more kinds of wireless communication among Wi-Fi, Bluetooth, Zigbee, ultra-wide band (UWM), wireless USB, and near field communication (NFC).

The communicator 201 may further include an antenna for receiving an image signal from the exterior, a tuner for processing a signal received through the antenna in order to provide image information, a demodulator, and so on. The communicator 201 may be configured to receive at least one among a terrestrial broadcast signal, a satellite signal and a cable signal. Further, the communicator 201 may receive a broadcast signal or the like through a digital broadcast system such as digital multimedia broadcasting-terrestrial (DMB-T), digital multimedia broadcasting-satellite (DMB-S), media forward link only (MediaFLO), digital video broadcast-handheld (DVB-H), integrated services digital broadcast-terrestrial (ISDB-T), etc. The received broadcast signal is processed for displaying an image embedded therein and then provide to the display 100, and the display 100 is configured to display an image based on the processed image signal.

The communicator 201 may be configured to receive data involving image information through the external module 2 or the network. The received data is provided to the display 100, and the display 100 displays an image based on the received data. The external module 2 may modulate a level of power to be transmitted and provide data embedded in the power. In other words, the external module 2 and the display apparatus 1 may be configured to wirelessly transmit and receive a message and an image through the wireless power transmission method, details of which will be described in greater detail below.

Further, the communicator 201 may be configured to send the external module 2 information about at least one among power consumed in the display apparatus 1, power to be consumed in the display apparatus 1, and an efficiency of wireless power transmission. For example, the communicator 201 may be configured to give the external module 2 information about a feedback current related to power consumed in loads of the display apparatus 1, a target voltage related to required power calculated in the controller 203 of the display apparatus 1, and an efficiency of analyzed wireless power transmission.

Under control of the controller 203, the communicator 201 may be configured to stop some operations in order to reduce the power consumed in the communicator 201. Since the information about the reduced consumption power has to be sent to the external module 2, there are no limits to communication with the external module 2, but network communication with other external apparatuses may be limited for reducing the consumption power. According to another example embodiment, in order to reduce the consumption power, the communicator 201 may stop all communication operations and the external module 2 stops transmitting the power if receiving no information from the communicator 201. The display apparatus 1 may be driven using a built-in battery or the like while the power transmission is suspended.

The information acquirer 101 may include various circuitry configured to acquire information about a distance between the display apparatus 1 and a user. In more detail, the information acquirer 101 may include various circuitry, such as, for example, and without limitation, a sensor that senses a distance between the display apparatus 1 and a user and generate information about the distance between the display apparatus 1 and a user based on sensing, or may receive information from an external sensing device that senses a distance between the display apparatus 1 and a user and generates the information about the sensed distance.

The controller 203 is configured to control general operations of the display apparatus 1. For example, the controller 203 controls the display 100 to display an image based on a received image signal, determines a consumption power of the display apparatus 1, determines an efficiency of wireless power transmission based on the power received through the wireless power receiver 200, and controls the communicator 201 to provide power-relevant information to the external module 2.

As described above, the external module 2 is configured to transmit power with an efficiency optimized to the display apparatus 1 based on the information about the consumption power of the display apparatus 1 and the efficiency of the wireless power transmission.

Further, the controller 203 is configured to determine whether a user comes within a critical predetermined distance, e.g., range, from the display apparatus 1 based on information about the distance between the display apparatus 1 and a user, acquired in the information acquirer 101, and perform control operations for reducing the consumption power of the display apparatus 1 if it is determined that a user comes within the critical range from the display apparatus 1.

In other words, if a user comes within the distance where s/he may be affected by an electromagnetic field formed by the wireless power transmission between the external module 2 and the display apparatus 1, the consumption power is reduced to have no harmful effect on a user so as to lower the level of the power transmitted from the external module 2 to the display apparatus 1, thereby protecting a human body of a user.

To reduce the consumption power, the controller 203 may lower the brightness of the display 100 or a resolution of an image to be displayed. As described above, the display 100 includes the display panel and the light source for emitting light to the display panel. The power consumed in the display 100 is reduced if the quantity of light emitted from the light source is decreased, and the power needed for processing an image signal or data is less consumed if an image to be displayed on the display panel has a lower resolution. Therefore, the power consumed in the display apparatus 1 is reduced, thereby lowering the level of power to be transmitted from the external module 2 to the display apparatus 1.

Further, the controller 203 may control the loudspeaker to lower a level of an output sound. As the level of the sound output from the loudspeaker is lowered, the level of the power consumed in the loudspeaker is decreased, thereby lowering the level of the power transmitted from the external module 2 to the display apparatus 1.

Further, the controller 203 may control the communicator 201 to suspend some operations of the communicator 201. The communicator 201 communicates with not only the external module 2 but also other external apparatuses through the network to receive various pieces of information. Since the communicator 201 has to exchange information for power transmission with the external module 2, the communications with the external apparatus other than the external module 2 may be suspended to reduce the consumption power. According to another example embodiment, the communicator 201 may be configured to suspend communication with the external module 2, and the external module 2 may cease the power transmission if receiving no information from the display apparatus 1.

In addition, the controller 203 may restrict operations of other elements in the display apparatus 1, thereby reducing the consumption power of the display apparatus 1. For example, operations of a signal receiver for receiving an external signal may be restricted, or a signal processor for processing the received external signal may be restricted. Further, operations of a user command input unit may be restricted. Likewise, at least one among various functions provided by the display apparatus 1 may be restricted to reduce the consumption power of the display apparatus 1.

The display apparatus 1 may be in a standby mode using the minimum and/or reduced power supplied from the built-in battery or the like if receiving no power from the external module 2.

If the display apparatus 1 decreases a brightness level, lowers an output level of the loudspeaker or performs the like operation for reducing the consumption power whenever a user is close to the display apparatus 1, it may be inconvenient for users who are using the display apparatus 1 since such an operation is performed even through a user passes by the display apparatus 1 for a short time. Therefore, the controller 203 may determine whether a critical time elapses after a part of a human body of the user comes within the critical range based on information acquired by the information acquirer 101, and does not perform the control operation for reducing the consumption power if the part of the human body goes out of the critical range before exceeding a first critical time. If the critical time is over after a part of a human body comes within the critical range, the controller 203 is configured to perform the control operation for reducing the consumption power.

Further, the controller 203 determines whether a user who comes within the critical range moves or not. If the user does not move, the controller 203 performs the control operation for reducing the consumption power. On the other hand, if the user moves, the controller 203 determines whether the movement lasts for more than a second critical time and performs the control operation for reducing the consumption power when it is determined that the movement lasts for more than the second critical time.

Further, if a user is moving, the controller 203 may determine whether the user moves in a direction away from the display apparatus 1 or in a direction closer to or having no change in distance from the display apparatus 1. If it is determined that a user is moving away from the display apparatus 1, the controller 203 does not reduce the consumption power. On the other hand, if it is determined that a user is moving closer to or having no change in distance from the display apparatus 1, the controller 203 determines whether a third critical time is over and then reduces the consumption power when the third critical time is over.

The first critical time, the second critical time and the third critical time are previously set for determining a user's intention, which may be equal to or different from one another.

Further, the controller 203 determines a distance between a user and the display apparatus 1 based on information about the distance between a user and the display apparatus 1 acquired by the information acquirer 101, and reduces the consumption power based on the determined distance. For example, if the distance between a user and the display apparatus 1 is not less than 2 m, the controller 203 drives the display apparatus 1 to consume power at an efficiency of 100%. If the distance between a user and the display apparatus 1 is about 1.5 m, the display apparatus 1 is driven to consume power at an efficiency of 70%. If the distance between a user and the display apparatus 1 is less than 1 m, the display apparatus 1 is driven to consume power at an efficiency of 30%. For example, the controller 203 increases the percentage of reducing power as the distance between a user and the display apparatus 1 becomes shorter. The distances and efficiencies provided above are merely examples, and it will be understood that the present disclosure is not limited thereto.

Further, the controller 203 may control the display 100 to display the distance between a user and the display apparatus based on the acquired information, and may warn, notify or inform a user using a sound or voice output from the loudspeaker or a guide displayed on the display 100 before reducing the power.

Figure 3:
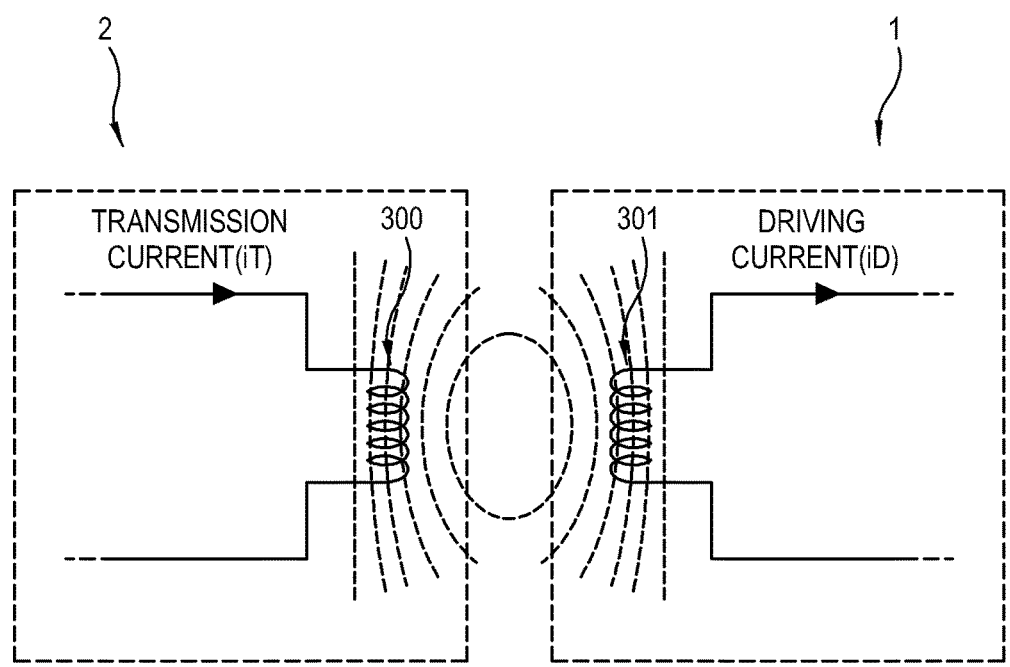
FIG. 3 is a diagram illustrating an example of wirelessly transmitting power based on magnetic induction according to an example embodiment.

FIG. 3 is a diagram illustrating an example of wirelessly transmitting power based on magnetic induction according to an example embodiment.

In the following description, the foregoing magnetic induction between the external module 2 and the display apparatus 1 will be used below to wirelessly transmit and receive power, but this has to be not construed as limiting the scope of the present disclosure. Alternatively, various publicly known technologies may be used in wirelessly transmitting power between the external module 2 and the display apparatus 1.

To wirelessly transmit and receive power between the external module 2 and the display apparatus 1 by the magnetic induction, power supplied from the exterior is converted into a wireless power signal and then transmitted to the display apparatus 1. The wireless power signal is provided in the form of an oscillating magnetic field or electro-magnetic field. To this end, the external module 2 for transmitting power may include a TX (e.g., transmit) coil portion 300, and a wireless power receiver 100 of the display apparatus 1 for receiving power may include an RX (e.g., receive)coil portion 301.

The TX coil portion 300 is configured to form a magnetic field corresponding to a wireless power signal as an electric current varies. The TX coil portion 300 may be achieved, for example, by a planar spiral type or a cylindrical solenoid type, or the like.

The external module 2 may further include an inverter (not shown). The inverter converts direct current (DC) power received from the exterior into a transmission current iT having an alternating current (AC) waveform. The transmission current iT flows in a resonant circuit including the TX coil portion 300 and a capacitor, so that a magnetic field can be induced in the TX coil portion 300 by the transmission current iT.

In the magnetic induction method, the efficiency of transmitting power may be affected by arrangement and distance between the elements. In a case where the RX coil portion 301 of the wireless power receiver 200 is not positioned within a suitable range of the induced magnetic field, the external module 2 may determine the position of the wireless power receiver 200 and change the position of the TX coil portion 300 so that a distance between the centers of the TX coil portion 300 and the wireless power receiver 200 can be within a certain suitable range. To this end, the external module 2 may further include a sensor and a position adjuster.

The wireless power receiver 200 of the display apparatus 1 may further include the RX coil portion 301 and a rectifier (not shown). The power supplied from the exterior is converted by the external module 2 into the transmission current iT having an AC waveform, and the AC characteristic of the transmission current iT causes a magnetic field to be formed in the TX coil portion 300. Further, variation in the magnetic field causes a driving current iD to be induced in the RX coil portion 301 for driving the display apparatus 1. Like the TX coil portion 300, the RX coil portion 301 may be achieved, for example, by a planar spiral type or a cylindrical solenoid type, or the like.

For resonant detection or a high efficiency of wirelessly receiving power, series and parallel capacitors may be connected to the RX coil portion 301.

According to another example embodiment, the TX coil portion 300 and the RX coil portion 301 may employ a dipole coil having a core. To wirelessly transmit power by the magnetic induction of the dipole coil, the TX coil portion 300 and the RX coil portion 301 may be achieved by winding a litz wire around a long bar-type core in the form of a helical coil. The electric current flowing in the TX coil portion 300 generates a magnetic field, and the generated magnetic field is partially applied to the core of the RX coil portion 301, thereby forming a magnetic flux linkage. The formed magnetic flux linkage induces an electric current in the display apparatus 1. For example, the dipole coil makes it possible to transmit power stably even though the external module 2 and the display apparatus 1 are separated by a distance of as much as 5 m.

Figure 4:
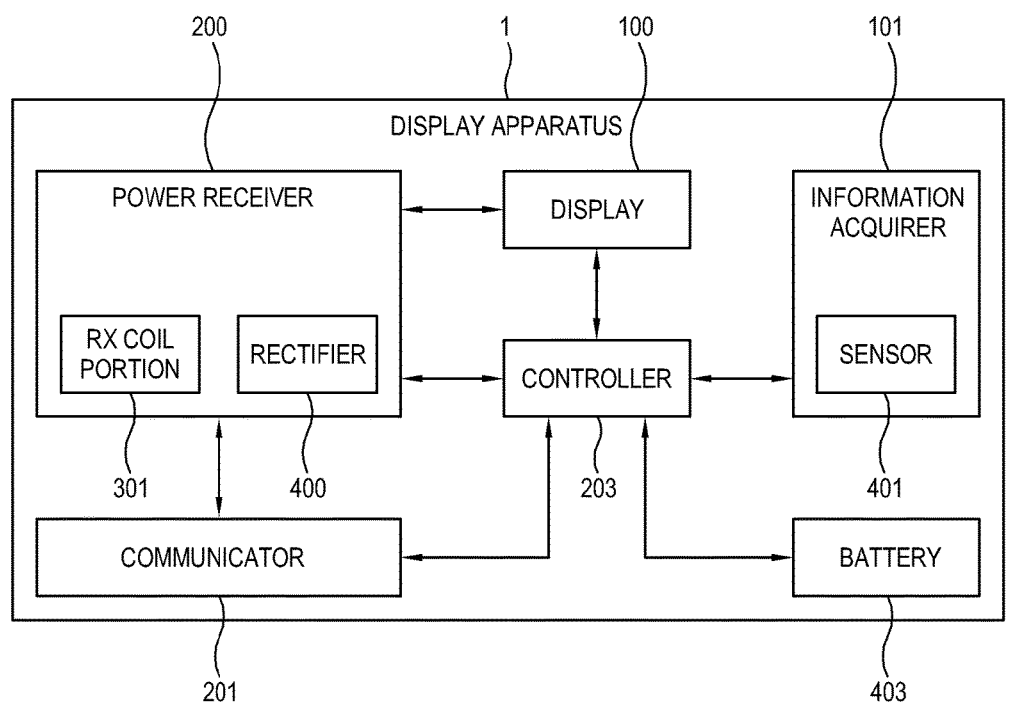
FIG. 4 is a block diagram illustrating an example display apparatus according to an example embodiment.

FIG. 4 is a block diagram illustrating an example display apparatus according to an example embodiment;

The display apparatus 1 may include a power receiver 200 including the RX coil portion 301 and the rectifier 400 to wirelessly receive power from the external module 2.

As described above, the RX coil portion 301 may be achieved, for example, by the planar spiral type or the cylindrical solenoid type, and include the driving current iD in accordance with variation in the magnetic field formed in the TX coil portion 300 of the external module 2.

The rectifier 400 may be configured to apply full-wave rectification, half-wave rectification, etc. to an electric current in order to convert AC into DC. For example, the rectifier 400 may be achieved, for example, by a bridge circuit using four diodes or a circuit using active elements for rectification.

The rectifier 400 may further include a smoothing circuit (e.g., a regulator) for making the rectified current flat and stable, and a DC-DC converter for properly adjusting a voltage.

The electric current rectified in the rectifier 400 is supplied as power to the elements of the display apparatus 1.

According to an example embodiment, the information acquirer 101 may receive information about a distance between the display apparatus 1 and a user from a sensing device, but not limited thereto. Alternatively, the information acquirer 101 may further include a sensor 401 to sense the distance between the display apparatus 1 and a user, and generate information about the distance based on the sensing. The sensor 401 may further include various sensors for sensing a distance from a user. The sensor 401 may sense a close object based on variation in an AC magnetic field, variation in a static magnetic field, a change rate of electrostatic capacitance, etc., or may further include an ultrasonic or infrared sensor for measuring a distance from a user. Further, the sensor 401 may further include a heat detector or the like to determine whether a close object is a human body or a thing.

Based on information about the distance between a user and the display apparatus 1 sensed by the sensor 401, the controller 203 determines whether a user comes within the predetermined critical distance, how far a user is located from the display apparatus 1, whether a user moves or not, and whether a user moves away from the display apparatus 1 or moves closer to or having no change in distance from the display apparatus 1 if the user is moving.

In this example embodiment, the magnetic induction method is used in wireless power transmission between the external module 2 and the display apparatus 1, but not limited thereto. Alternatively, the magnetic resonance method, the electromagnetic wave method, and the like publicly known wireless power transmission method may be used as described above.

The display apparatus 1 may further include a battery 403, and the controller 203 may charge the battery 403 with some of the power received in the wireless power receiver 200. When the power transmission from the external module 2 is cut off, the battery 403 supplies power needed for driving the display apparatus 1. In accordance with capacity of the battery 403, the display apparatus 1 may operate normally or enter an idle model of using the minimum power.

Below, the operations of the display apparatus 1 will be described based on the distances between a user and the display apparatus 1 during the wireless power transmission between the external module 2 and the display apparatus 1.

Figure 5:
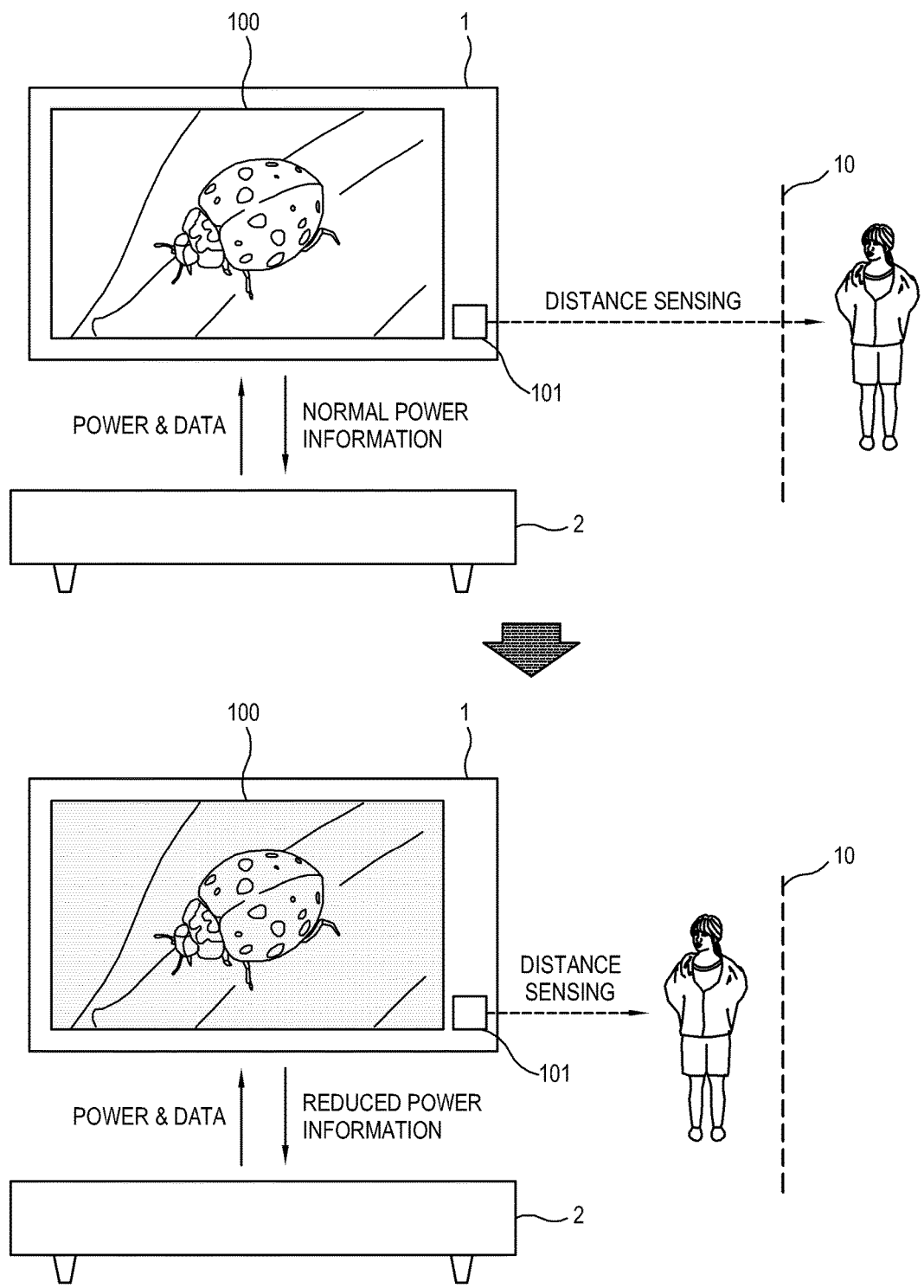
FIG. 5 is a diagram illustrating an example of reducing consumption power based on a distance between a user and a display apparatus according to an example embodiment.

FIG. 5 is a diagram illustrating an example of reducing consumption power based on a distance between a user and a display apparatus according to an example embodiment.

According to an example embodiment, the display apparatus 1 is driven by receiving power from the external module 2. Further, the display apparatus 1 sends the external module 2 information about power to be consumed, an efficiency of wireless power transmission, and the like, so that the external module 2 can transmit power based on the information.

Referring to the upper drawing in FIG. 5, the information acquirer 101 senses a distance between a user and the display apparatus 1. Based on information about the distance acquired in the information acquirer 101, a user is outside of the critical range 10 from the display apparatus 1. Therefore, the display apparatus 1 sends the external module 2 information about the consumption power or the like based on a normal operation, and the external module 2 wirelessly transmits power to the display apparatus 1 based on the received information. While power is normally supplied to the display 100, the light source of the display 100 illuminates the display panel with a normal brightness level, and thus the display 100 displays an image based on the normal brightness level. The display apparatus 1 keeps normal operations and sends related information to the external module 2 in real time.

Referring to the lower drawing in FIG. 5, a user is now within the critical range 10 from the display apparatus 1. If the information acquirer 101 acquires information about a distance between a user and the display apparatus 1, the controller 203 performs control operations for reducing the consumption power of the display apparatus 1.

In this example embodiment, the control operations performed in the controller 203 for reducing the consumption power are, for example, as follows. First, the controller 203 may control the light source of the display 100 to decrease a level of emitted light. As the level of light emitted from the light source to the display panel decreases, the display 100 displays a relatively dark image based on brightness of the decreased level. Since the decreased level of light causes the power consumed in the display apparatus 1 to be reduced, the controller 203 determines the consumption power of the display apparatus 1 and controls the communicator 201 to send information about the determined consumption power to the external module 2. Based on the received information about the consumption power, the external module 2 lowers a level of power to be transmitted and transmits the power with the lowered level to the display apparatus 1. As the level of power wirelessly transmitted between the apparatuses 1 and 2 is lowered, radiation intensity of a magnetic field is also decreased, thereby having less harmful effect on a human body.

The controller 203 may perform such a control operation for reducing the consumption power if a user's human body comes within the critical range 10.

Figure 6:
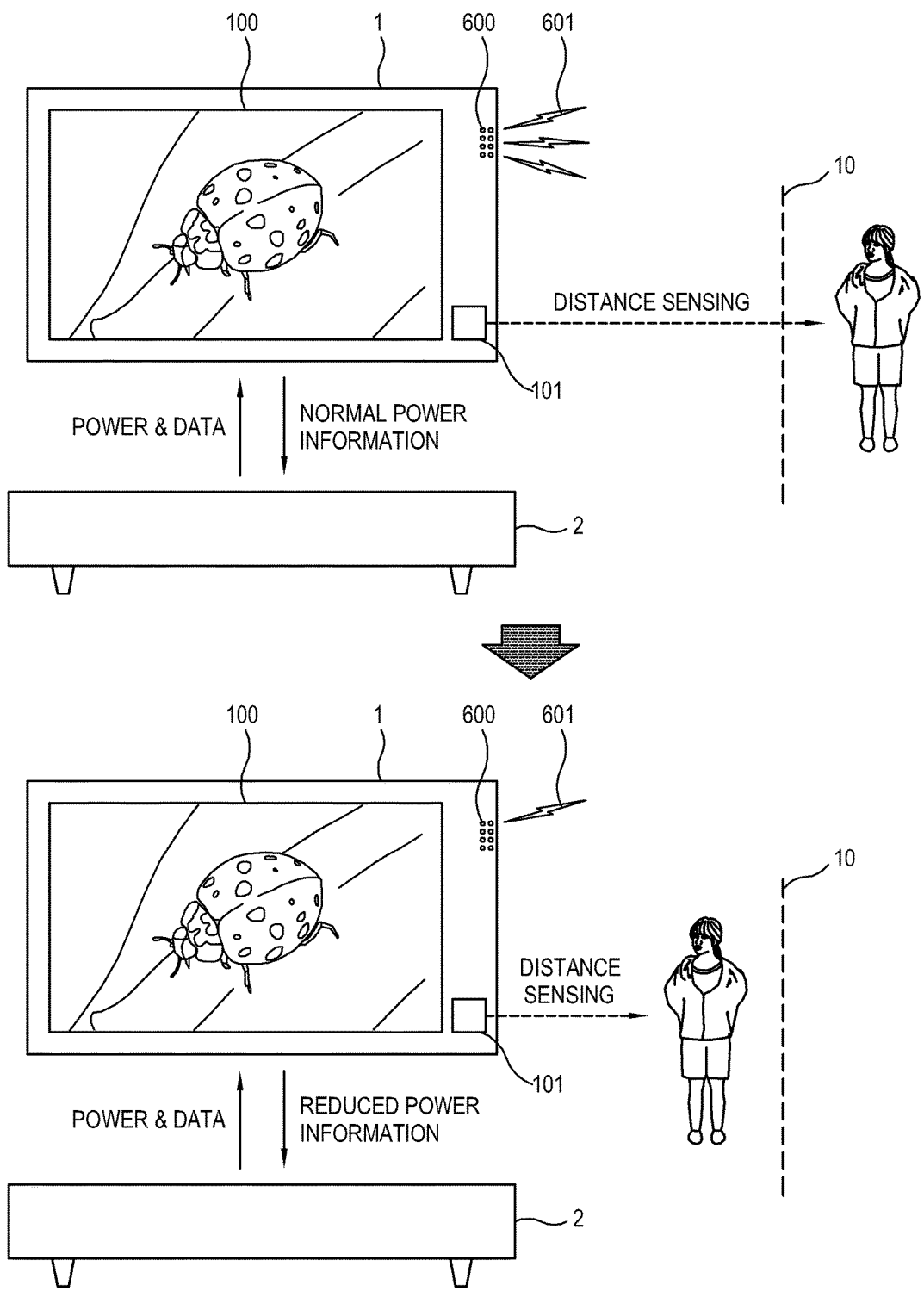
FIG. 6 is a diagram illustrating an example of reducing consumption power based on a distance between a user and a display apparatus according to an example embodiment.

FIG. 6 is a diagram illustrating an example of reducing consumption power based on a distance between a user and a display apparatus according to an example embodiment.

The display apparatus 1 in this example may further include a loudspeaker 600, and the loudspeaker 600 may output a sound or voice 601 based on a received signal as described above. To reduce the consumption power in the display apparatus 1, the controller 203 may control not only the light source of the display 100 but also the loudspeaker 600.

Referring to the upper drawing of FIG. 6, the information acquirer 101 senses a distance between a user and the display apparatus 1. Based on the information about the distance acquired in the information acquirer 101, a user is outside of the critical range 10 from the display apparatus 1. Thus, the display apparatus 1 sends the external module 2 information about the consumption power based on normal operations, and the external module 2 wirelessly transmits power to the display apparatus 1 based on the received information. While power is normally supplied, the loudspeaker 600 outputs a sound 601 having a normal level. The display apparatus 1 keeps normal operations, and provides the related information to the external module 2 in real time.

Referring to the lower drawing in FIG. 6, a user is within the critical range 10 from the display apparatus 1. If the information acquirer 101 acquires information about the distance between a user and the display apparatus 1, the controller 203 may perform control operations for reducing the consumption power of the display apparatus 1.

In this example embodiment, the control operations of the controller 203 for reducing the consumption power may be as follows. First, the controller 203 may control the loudspeaker 600 to lower a level of output sound 601. Under the control of the controller 203, the loudspeaker 600 outputs a sound 601 having a low level 601. As the level of the sound 601 output from the loudspeaker 600 is lowered, the power consumed in the display apparatus 1 is reduced. Thus, the controller 203 determines the consumption power of the display apparatus 1 and controls the communicator 201 to send the external module 2 information about the determined consumption power. The external module 2 lowers the level of power to be transmitted and provides the power having the lowered level to the display apparatus 1 based on the received information about the consumption power. As the level of power wirelessly transmitted between the apparatuses 1 and 2 is lowered, radiation intensity of a magnetic field is also decreased, thereby having less harmful effect on a human body.

Figure 7:
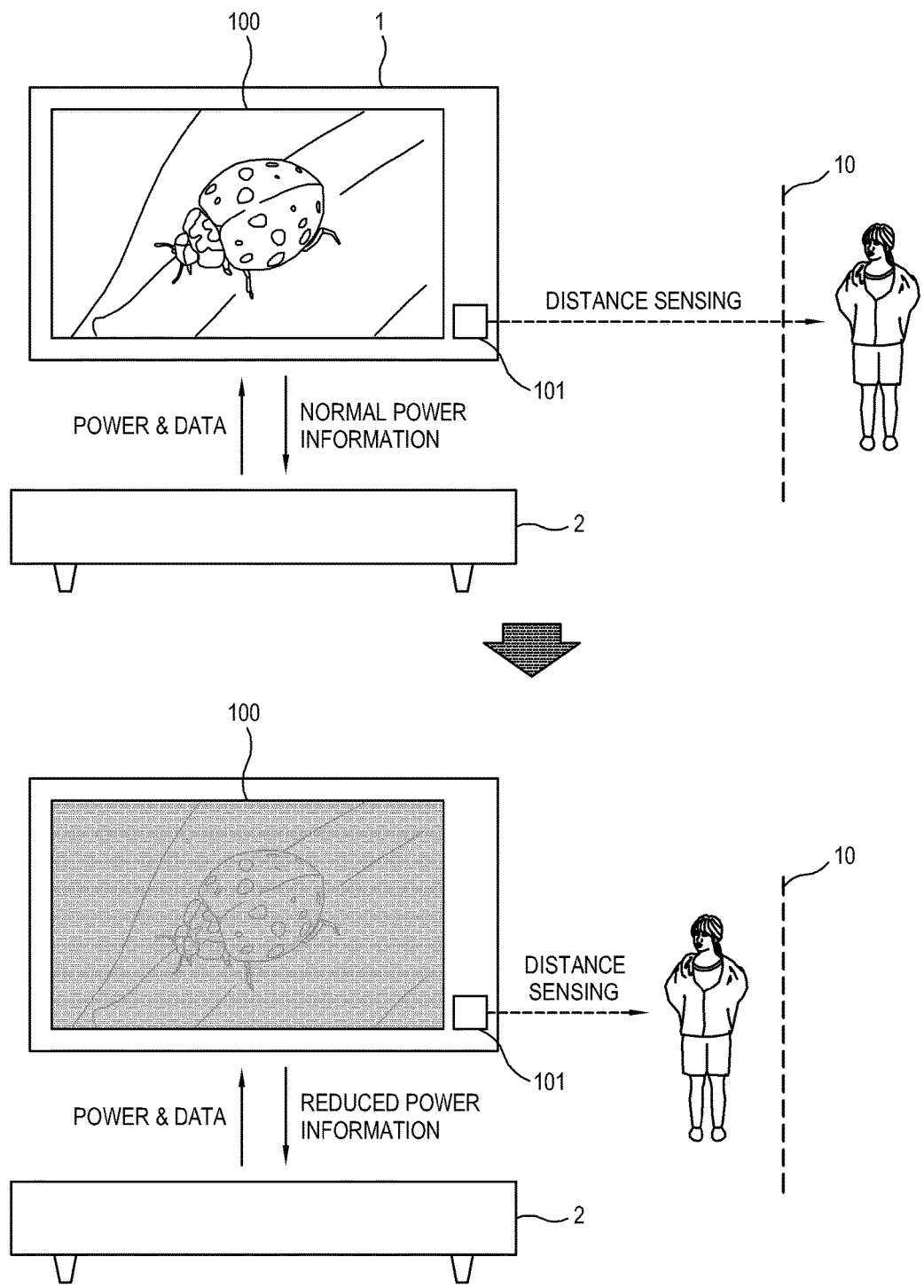
FIG. 7 is a diagram illustrating an example of reducing consumption power based on a distance between a user and a display apparatus according to an example embodiment.

FIG. 7 is a diagram illustrating an example of reducing consumption power based on a distance between a user and a display apparatus according to an example embodiment.

The display apparatus 1 can reduce the consumed power by adjusting not only brightness but also quality of an image to be displayed. The quality of image is varied depending on the number of pixels, e.g., the minimum unit of the image. As the number of pixels increases, an image is displayed with higher definition. For example, there are high definition (HD) corresponding to a resolution of about one million pixels, full high definition (FHD) corresponding to a resolution of about two million pixels, and ultrahigh definition (UHD) corresponding to a resolution of about eight million pixels, etc. For the higher quality of an image, more pixels are required and thus consume more power. That is, it is possible to reduce the consumed power if the display apparatus 1 supporting the UHD displays an HD image.

Referring to the upper drawing in FIG. 7, the information acquirer 101 senses a distance between a user and the display apparatus 1. Based on information about the distance acquired by the information acquirer 101, a user is outside of the critical range 10 from the display apparatus 1. Therefore, the display apparatus 1 sends the external module 2 information about the consumption power based on normal operations, and the external module 2 wirelessly transmits power to the display apparatus 1 based on the received information. While power is normally supplied, the display 100 outputs an image with default quality. The display apparatus 1 keeps normal operations and provides the related information to the external module 2 in real time.

Referring to the lower drawing in FIG. 7, a user is within the critical range 10 from the display apparatus 1. If the information acquirer 101 acquires information about a distance between a user and the display apparatus 1, the controller 203 performs control operations for reducing the consumption power of the display apparatus 1.

In this example embodiment, the control operations performed in the controller 203 for reducing the consumption power may be as follows. First, the controller 203 controls the display 100 to lower the quality of an image to be displayed. Under control of the controller 203, the display 100 displays an image of which quality is lower than the default quality. As the quality of the displayed image is lowered, the power consumed in the display apparatus 1 is also lowered. There, the controller 203 determines the consumption power of the display apparatus 1, and controls the communicator 201 to send the external module 2 information about the determined consumption power. Based on the received information about the consumption power, the external module 2 lowers a level of power to be transmitted and transmits the power with the lowered level to the display apparatus 1. As the level of power wirelessly transmitted between the apparatuses 1 and 2 is lowered, radiation intensity of a magnetic field is also decreased, thereby having less harmful effect on a user's human body.

Figure 8:
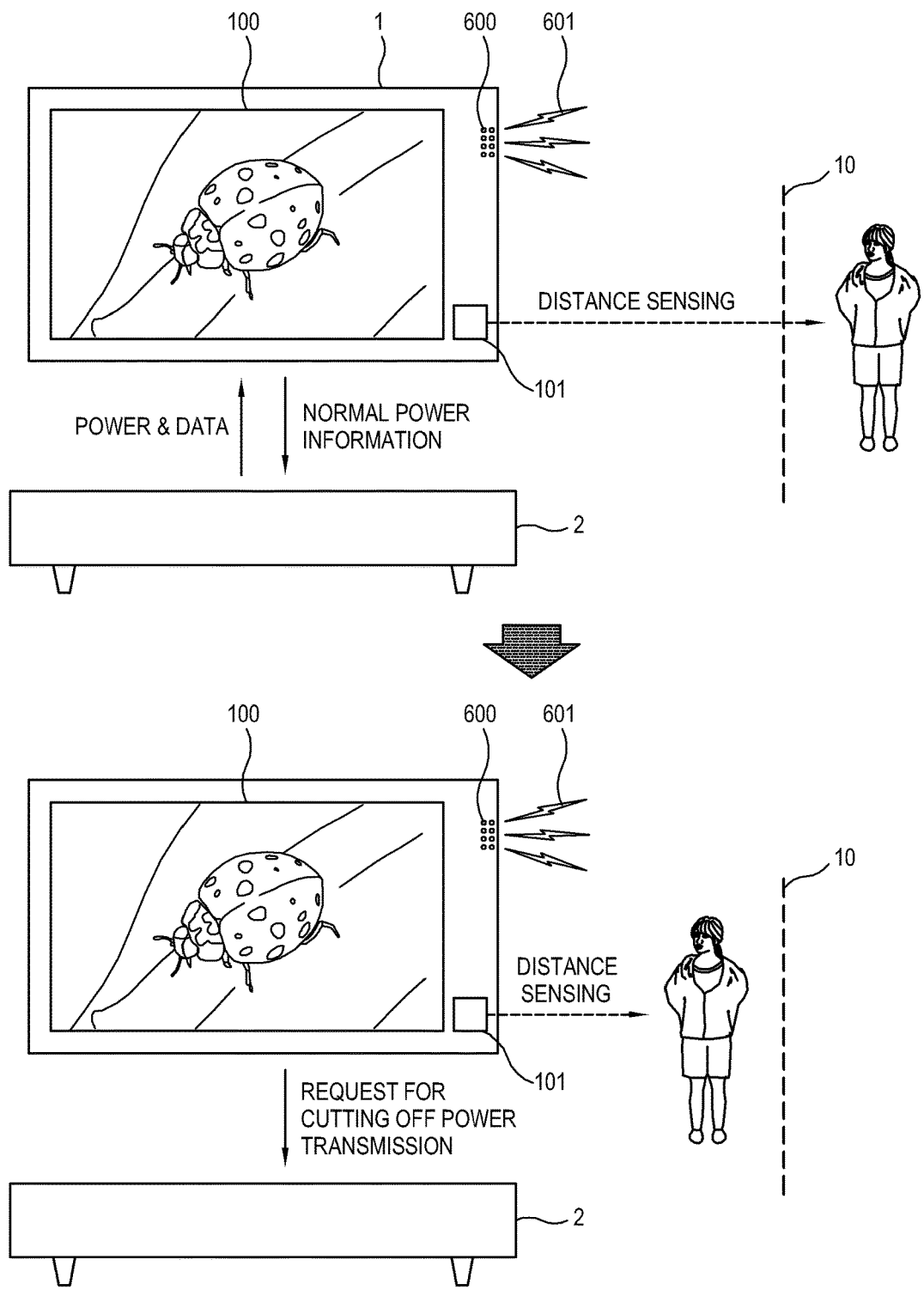
FIG. 8 is a diagram illustrating an example of ceasing transmitting power based on a distance between a user and a display apparatus according to an example embodiment.

FIG. 8 is a diagram illustrating an example of ceasing transmitting power based on a distance between a user and a display apparatus according to an example embodiment.

The display apparatus 1 may further include the battery 403, and the controller 203 is configured to charge the battery 403 with some of the power received in the wireless power receiver 200. If the power transmitted from the external module 2 is shut off, the shutoff may cause a trouble in the display apparatus 1. Therefore, the display apparatus 1 may enter a standby mode in which the minimum power supplied from the battery 40 is used to wait for power transmission. If the capacity of the battery 403 is enough to drive the display apparatus 1 to operate for a certain period of time, the operation being performed by the display apparatus 1 may be continued.

Referring to the upper drawing in FIG. 8, the information acquirer 101 senses a distance between a user and the display apparatus 1. Based on information about the distance acquired in the information acquirer 101, a user is outside of the critical range 10 from the display apparatus 1. The display apparatus 1 sends the external module 2 information about the consumption power based on normal operations, and the external module 2 wirelessly transmits power to the display apparatus 1 based on the received information. For example, the upper drawing in FIG. 8 shows that the display apparatus 1 normally operates.

Referring to the lower drawing in FIG. 8, a user is within the critical range 10 from the display apparatus 1. If the information acquirer 101 acquires information about a distance between a user and the display apparatus 1, the controller 203 controls the communicator 201 to make a request for cutting off the power supply to the external module 2. In response to the request from the display apparatus 1 to cut off the power supply, the external module 2 ceases the wireless power transmission. Although the power transmission from the external module 2 is cut off, the display apparatus 1 can keep normal operations with power received from the battery 403.

Since the wireless power transmission from the external module 2 is ceased even though the display apparatus 1 normally operates, there is no power transmitted and received between the apparatuses 1 and 2 and radiation intensity of a magnetic field is also noticeably decreased, thereby having little harmful effect on a human body.

In the foregoing example embodiments, when a user does not move when within the critical range 10 from the display apparatus 1, the controller 203 reduces the consumption power of the display apparatus 1 or makes a request for cutting off the power supply to the external module 2, and uses the battery 403, thereby lowering or cutting off the power wirelessly transmitted from the external module 2.

According to another example embodiment, the controller 203 may not perform the control operations for reducing the consumption power unless a preset critical time has passed even though it is determined based on the information acquired in the information acquirer 101 that a user has come within the critical range 10. In other words, it is desired to determine whether a user passes by the display apparatus 1 for a short time or a user is close to the display apparatus 1, thereby determining a user's true intention.

In the ICNIRP standards, safety regulations were notified for a human body's exposure to electromagnetic waves with respect to an average time of about 6 minutes. Therefore, a user may be little affected by electromagnetic waves even though his/her body is exposed to electromagnetic waves for a short time unless s/he is very sensitive to the electromagnetic waves.

Accordingly, the controller 203 may be configured not to reduce the consumption power of the display apparatus 1 by lowering or cutting off the power transmitted from the external module 2 even though a user comes within the critical range 10 unless s/he stays within the critical range 10 for more than the preset critical time.

Figure 9:
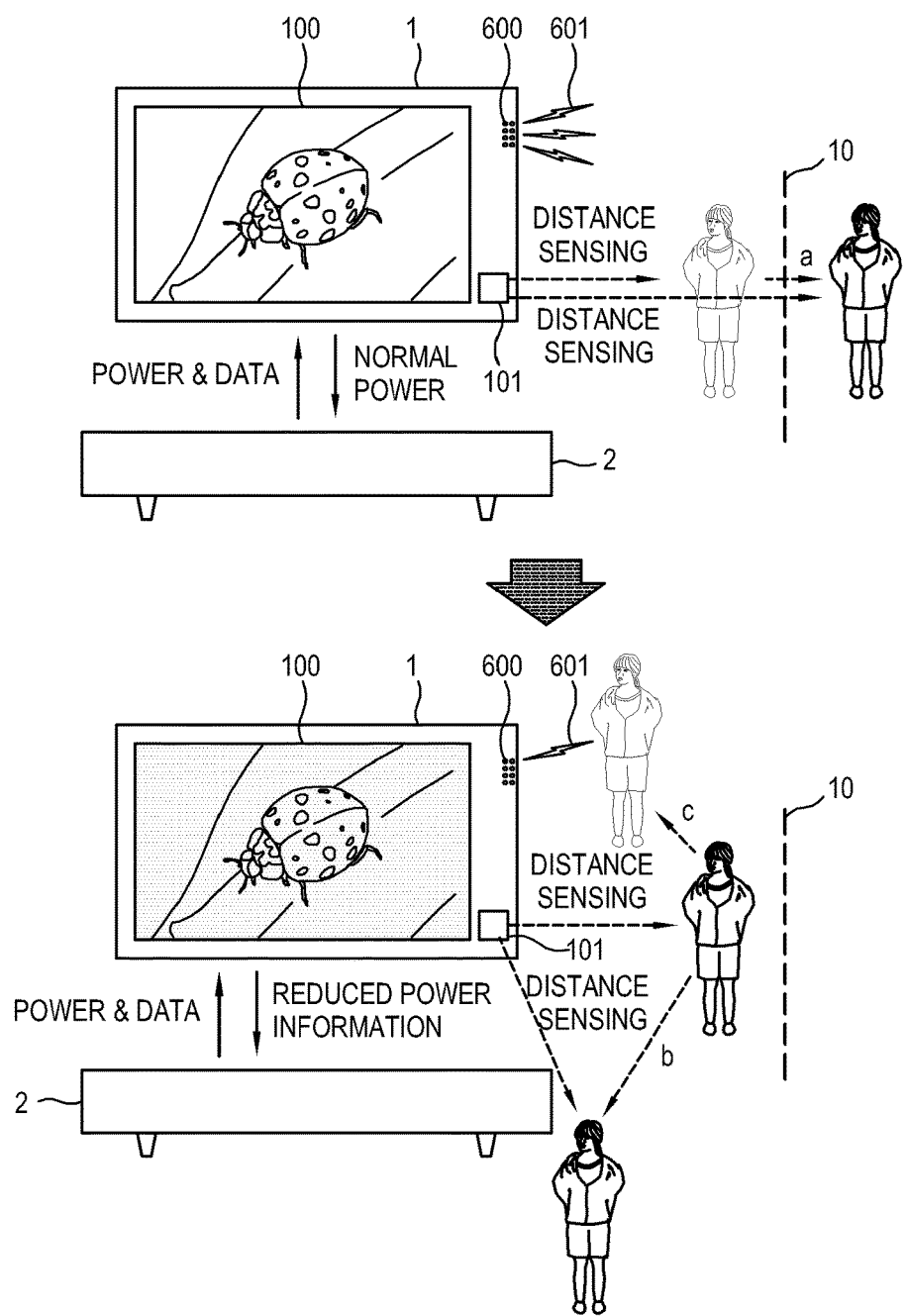
FIG. 9 is a diagram illustrating an example that a display apparatus according to an example embodiment reduces consumption power based on a user's motion.

FIG. 9 is a diagram illustrating an example in which a display apparatus reduces consumption based on a user's motion according to an example embodiment.

Based on the information about the distance acquired by the information acquirer 101, the controller 203 determines whether or not a user moves within the critical range 10 from the display apparatus 1. If a user does not move, the controller 203 performs the control operations for reducing the consumption power in accordance with the foregoing example embodiments. On the other hand, if a user is moving, the controller 203 performs the control operations for reducing the consumption power after the preset critical time elapses and the user remains within the critical range.

If a user stays within the critical range 10, the controller 203 performs the control operations for reducing the consumption power of the display apparatus 1 as described above after the preset critical time (i.e. the first critical time) elapses. If it is determined that a user is moving, the controller 203 performs the control operations for reducing the consumption power of the display apparatus 1 after the preset critical time (e.g., the second critical time or the third critical time) elapses. For example, the second critical time may be longer than the first critical time, and the third critical time may be shorter than the first critical time.

If a user is moving away from the display apparatus 1 (e.g. in a direction of 'a') even though the user is within the critical range 10 from the display apparatus 1, the user's body may be not affected by a harmful electromagnetic field even though the critical time is longer than that of when the user stays within the critical range 10.

On the other hand, if a user moves toward the display apparatus 1 or does not move away from the display apparatus 1 (e.g. in a direction of 'b' or 'c') and thus a distance between a user and the display apparatus 1 becomes shorter, a user's human body may be more strongly affected by harmful electromagnetic field. Therefore, the critical time has to be shorter than that of when a user stays within the critical range 10.

Referring to the upper drawing in FIG. 9, a user is moving away from the display apparatus 1 (e.g. in a direction of 'a'), and thus the controller 203 does not perform the control operations for reducing the consumption power so that the display apparatus 1 can operate normally if the second critical time does not elapse.

Referring to the lower drawing of FIG. 9, a user is moving without changing a distance from the display apparatus 1 (e.g. in the direction of 'b') or moving closer to the display apparatus 1 (e.g. in the direction of 'c'). Thus, the controller 203 performs the control operations for reducing the consumption power of the display apparatus 1 after the third critical time shorter than the first critical time elapses, so that the external module 2 can transmit power having a lower level to the display apparatus 1. The lower drawing in FIG. 9 illustrates an example that an image displayed on the display 100 is decreased in brightness as the display apparatus 1 reduces the consumption power and/or reduces the volume of the sound 601 output by the loudspeaker 600.

Figure 10:
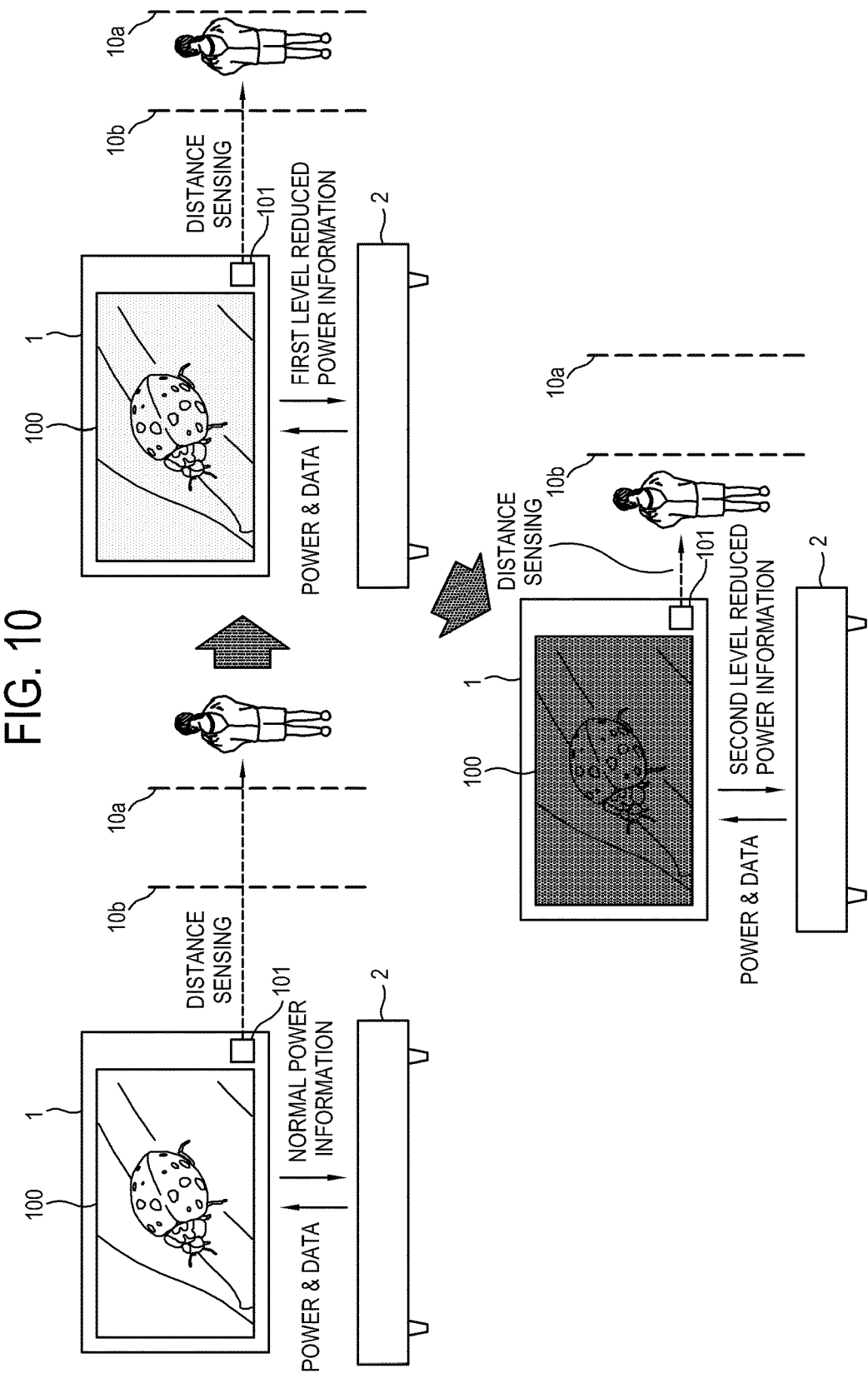
FIG. 10 is a diagram illustrating an example of reducing consumption power corresponding to a distance between a user and a display apparatus according to an example embodiment.

FIG. 10 is a diagram an example of reducing consumption power corresponding to a distance between a user and a display apparatus according to an example embodiment.

The controller 203 performs control operations for reducing the consumption power of the display apparatus 1 based on information about the distance between the display apparatus 1 and a user acquired by the information acquirer 101.

The closer a user gets to the display apparatus 1, the more the user is affected by the electromagnetic field radiated between the external module 2 and the display apparatus 1. The closer the distance between a user and the display apparatus 1, the less the consumption power of the display apparatus 1.

Referring to FIG. 10, if a user is out of the critical ranges 10a and 10b, the display apparatus 1 normally operates and the external module 2 normally supplies power to the display apparatus 1.

However, if a user is positioned between a first critical range 10a and a second critical range 10b, the controller 203 performs the control operations for reducing the consumption power of the display apparatus 1 by a first level. As illustrated in FIG. 10, the consumption power may be reduced by decreasing the brightness, but not limited thereto. Alternatively, the consumption power may be reduced by adjusting the output of the loudspeaker 600 controlling the operations of the communicator 201, or the like as described above. The external module 2 receives information about the consumption power reduced as much as the first level, and supplies power to the display apparatus 1 based on the received information.

If a user is positioned within the second critical range 10b closer to the display apparatus 1 than the first critical range 10a, the controller 203 may perform the control operations for reducing the consumption power of the display apparatus 1 by a second level. Since the consumption power of the display apparatus 1 is reduced as much as the second level, an image displayed on the display 100 is more decreased in brightness than that of when a user is positioned between the first critical range 10a and the second critical range 10b.

According to another example embodiment, the controller 203 may not stepwise reduce the consumption power based on the first and second critical ranges 10a and 10b, but may determine a user's distance in real time based on the information about the distance acquired in the information acquirer 101 and control the display 100 or the loudspeaker 600 to decrease brightness, image quality, a sound output level, etc. in proportional to the distances between a user and the display apparatus 1.

According to another example embodiment, the controller 203 lowers only the sound output level of the loudspeaker 600 when a user is positioned between the first critical range 10a and the second critical range 10b, and decreases the brightness of the display 100 when the user comes within the second critical range 10b. Likewise, the operations of different elements are restricted in accordance with distances of a user, thereby reducing the consumption power of the display apparatus 1.

According to another example embodiment, the controller 203 performs the control operations for reducing the consumption power of the display apparatus 1 when a user is positioned between the first critical range 10a and the second critical range 10b, but performs the control operations for receiving power from the battery 403 while making a request for cutting off the power transmission to the external module 2 when the user is within the second critical range 10b.

Figure 11:
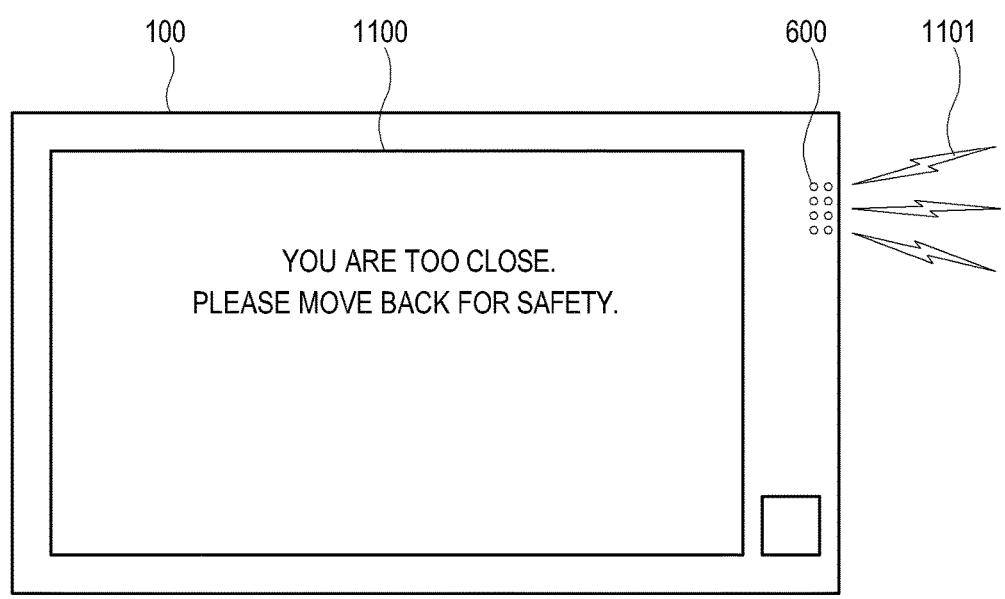
FIG. 11 is a diagram illustrating an example in which a display apparatus according to an example embodiment warns a user that s/he is too close to the display apparatus.

FIG. 11 is a diagram illustrating an example in which a display apparatus warns a user that s/he is too close to the display apparatus according to an example embodiment.

If it is determined that a user comes within the critical range 10 based on information about a distance between a user and the display apparatus 1 acquired by the information acquirer 101, the controller 203 may warn a user that the user is too close to the display apparatus 1.

The controller 203 may control the display 100 to display a user interface (UI) including a guide 1100 for guiding a user to move backward since the user is excessively close to the display apparatus 1, and may also control the loudspeaker 600 to output a relevant guide voice or warning sound 1101.

According to another example embodiment, the controller 203 performs the control operations for reducing the consumption power of the display apparatus 1 if a user comes within the critical range 10, and inform a user that an image is decreased in brightness or a sound is turned down as s/he is too close to the display apparatus 1.

Figure 12:
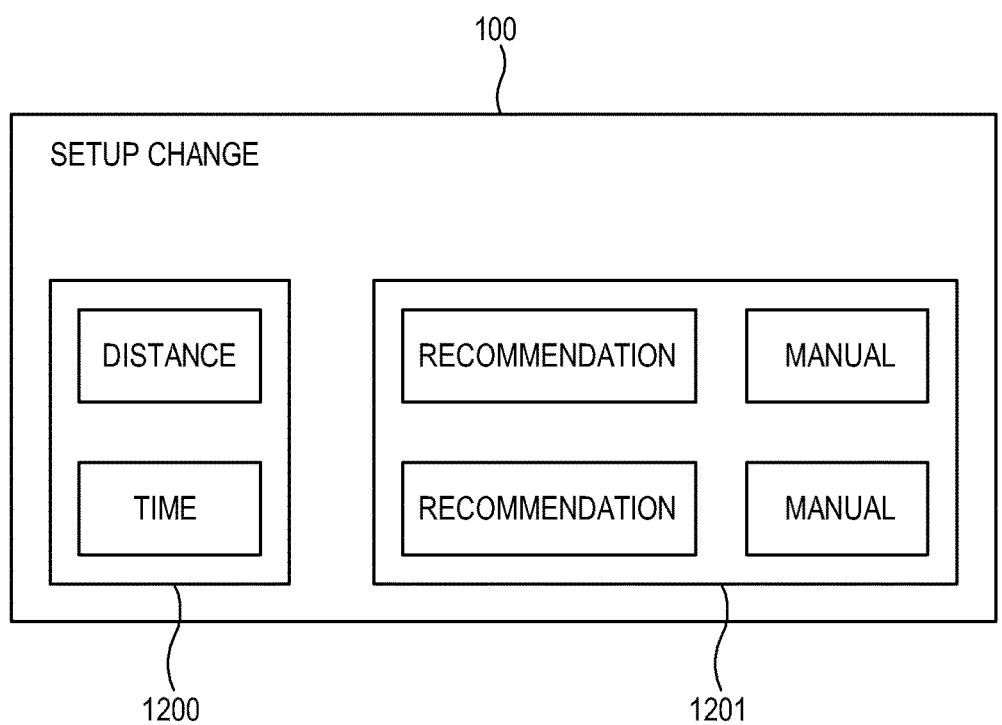
FIG. 12 is a diagram illustrating an example display apparatus providing a user interface to a user so that s/he can change setting information for reducing consumption power and adjusting wireless power transmission/reception according to an example embodiment.

FIG. 12 is a diagram illustrating an example in which a display apparatus provides a user interface to a user so that s/he can change setting information for reducing consumption power and adjusting wireless power transmission/reception according to an example embodiment.

The controller 203 may be configured to perform the control operations for reducing the consumption power based on preset setup information. The setup information may include information about the critical range and the critical time. For example, in order to reduce the consumption power, the setup information may include information about whether to decrease the brightness of quality of an image displayed on the display 100, whether to lower the level of the sound output from the loudspeaker 600, and which one among the operations of the communicator 201 will be restricted. Besides, the setup information may include information corresponding to various functions supported by the display apparatus 1.

Further, the setup information may be also used in calibrating the sensor of the information acquirer 101. Through tests, a difference between a user's actual position and the user's distance sensed by the sensor may be precisely adjusted by the calibration.

Referring to FIG. 12, the display 100 displays a user interface that includes a plurality of setup items 1200 for changing the setup information, and a menu item 1201 for changing the setup items. Thus, a user can select the setup information about the consumption power through the menu item 1201 for changing the setup items.

FIG. 12 illustrates only user interfaces about whether to set the critical range by a recommended distance or manually set the critical range and whether to set the critical time by a recommended time or manually set the critical time, but not limited thereto. Alternatively, various user interfaces so that a user can change the setup information corresponding to various functions of the display apparatus 1.

Figure 13:
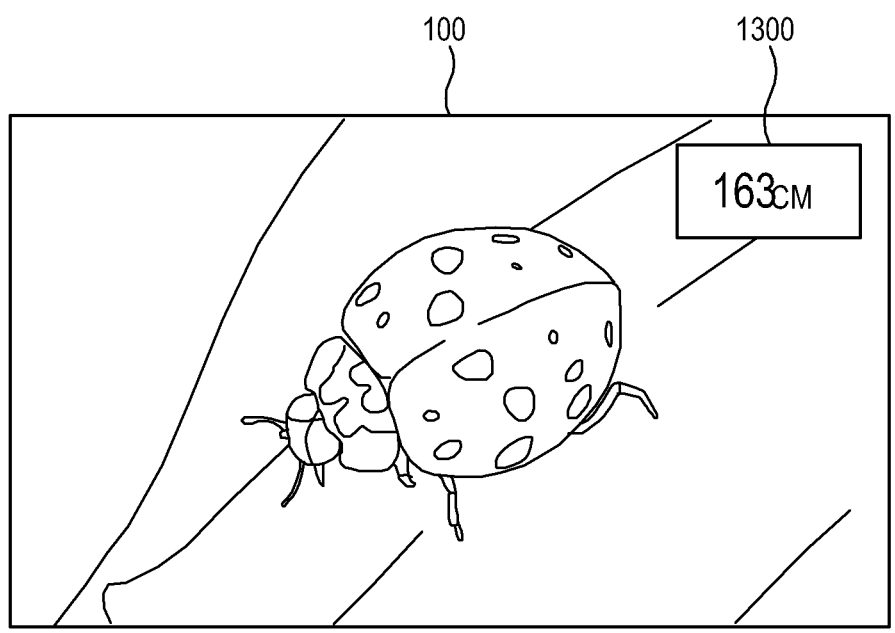
FIG. 13 is a diagram illustrating an example in which a display apparatus displays a user a distance from the display apparatus according to an example embodiment.

FIG. 13 is a diagram illustrating an example in which a display apparatus shows a user a distance from the display apparatus according to an example embodiment.

Based on information about a distance acquired by the information acquirer 101, the controller 203 may control the display 100 to display an image together with the distance 1300 between a user and the display apparatus 1. Thus, a user can keep a proper distance from the display apparatus 1 based on the displayed distance. The displayed distance may be represented by numerals as illustrated in FIG. 13, and other additional effects may be given to the displayed distance. As an example of the additional effects, the displayed numerals may be enlarged, moved toward the center or changed in color as the distance becomes shorter.

According to another example embodiment, the controller 203 may control the loudspeaker 600 to output voice information about the distance between a user and the display apparatus 1 or to output a warning sound whenever a user gets closer to the display apparatus at regular intervals from a certain distance.

Figure 14:
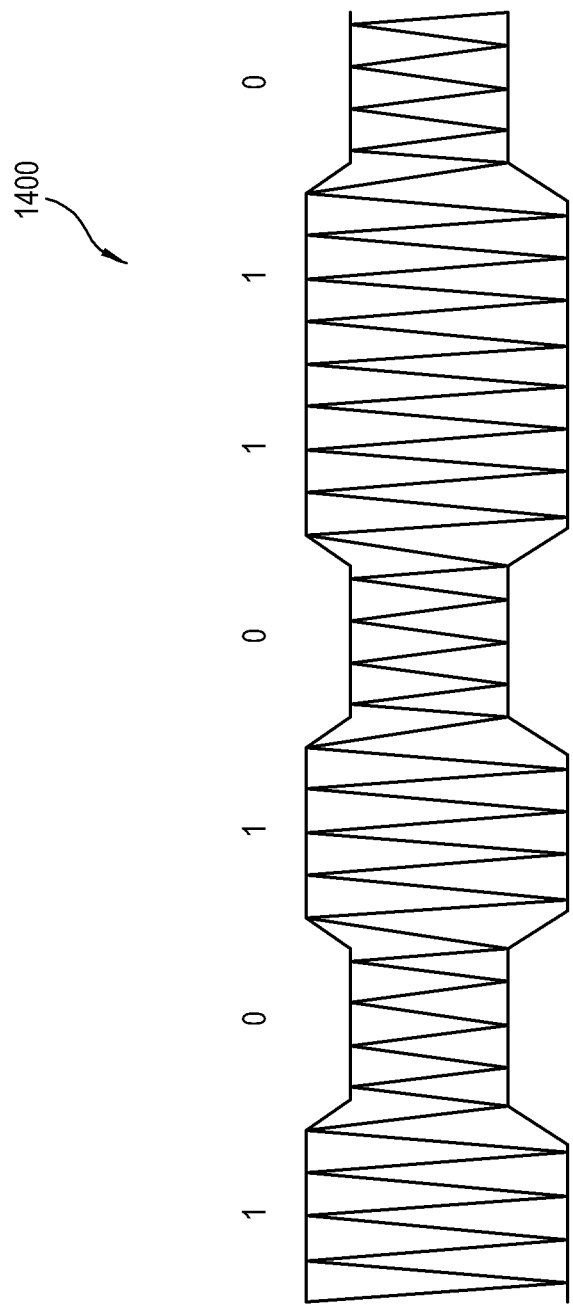
FIG. 14 is a diagram illustrating an example in which a display apparatus detects data based on conversion of power received from an external module according to an example embodiment.
Figure 15:
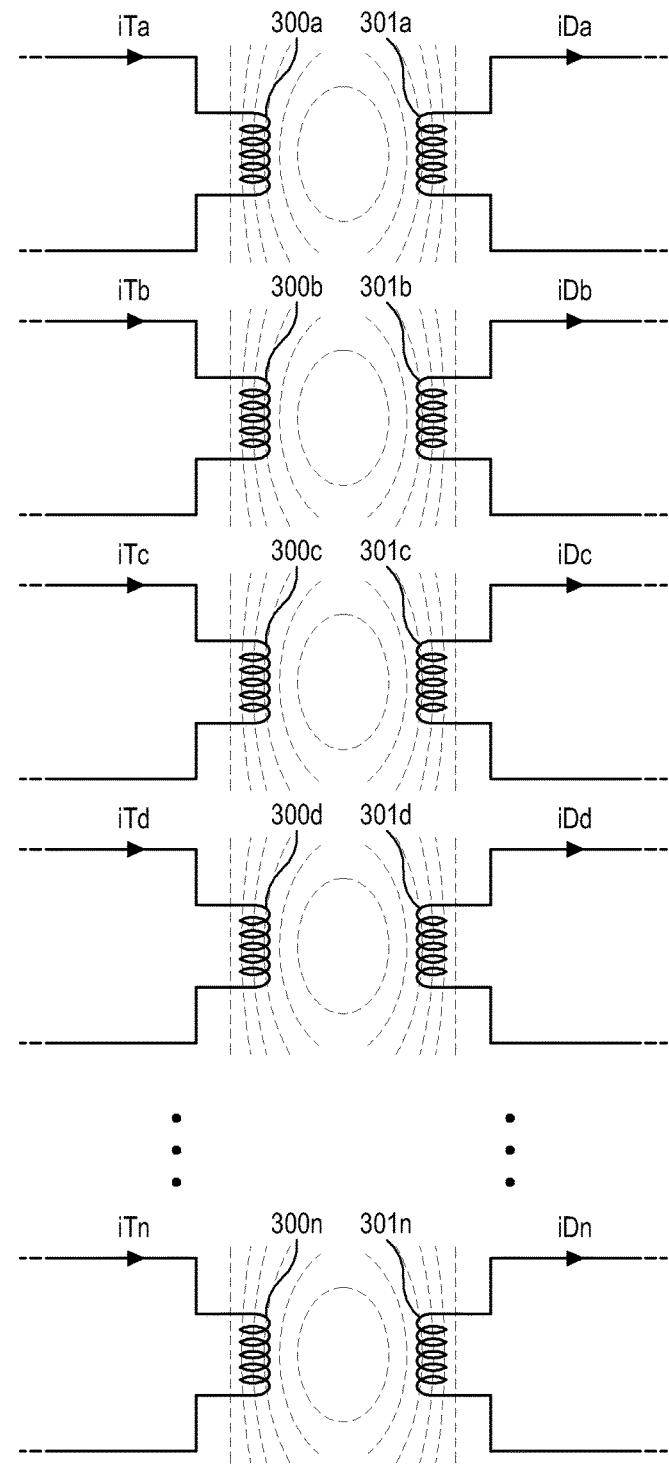
FIG. 15 is a diagram illustrating an example in which a display apparatus detects data based on conversion of power received from an external module according to an example embodiment.
Figure 16:
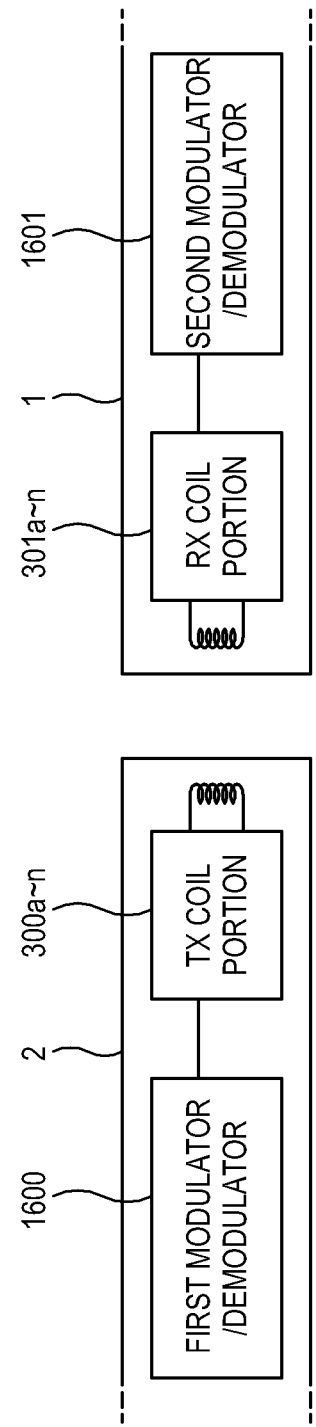
FIG. 16 is a diagram illustrating an example in which a display apparatus detects data based on conversion of power received from an external module according to an example embodiment.

FIGS. 14, 15 and 16 are diagrams illustrating examples in which a display apparatus detects data based on conversion of power received from an external module according to an example embodiment.

Below, an example of transmitting a message, an image or the like data together with power by modulating and demodulating the power will be described in the wireless power transmission between the external module 2 and the display apparatus 1 according to an example embodiment.

A wireless power signal forms a closed loop in a magnetic field or an electromagnetic field, and therefore the external module 2 modulates the wireless power signal before wirelessly transmitting power together with data to the display apparatus 1. If the modulated power is received in the display apparatus 1, the display apparatus 1 demodulates the received power, detects the data, and displays an image based on the data if the data is detected.

The power wirelessly transmitted between the external module 2 and the display apparatus 1 may be modulated and demodulated by at least one of amplitude modulation (AM), frequency modulation (FM) and phase modulation (PM). Besides, various modulation methods may be available in the wireless power transmission.

FIG. 14 is a diagram illustrating an example of providing data 1400 to the display apparatus 1 as the external module 2 applies the AM to the power to be wirelessly transmitted. For example, the external module 2 further includes a first modulator/demodulator 1600 and the TX coil portion 300, and modulates the amplitude of a power signal to correspond to data before transmitting power. The modulated power is transmitted from the TX coil portion 300 of the external module 2 to the RX coil portion 301 of the display apparatus 1. The received power is demodulated in a second modulator/demodulator 1601, and the data is extracted. The modulation of the amplitude is achieved by changing load impedance in the modulator/demodulator to modulate the amplitude of an electric current. A high amplitude of an electric current corresponds to a signal of 'HI' or '1', and a low amplitude of an electric current corresponds to a signal of 'LOW' or '0'. Although the electric current has the amplitude of 'LOW', the minimum power has to be given for driving the display apparatus 1.

FIG. 15 illustrates that the coil portions 300a~n and 301a~n of the external module 2 and the display apparatus 1 include a plurality of coils to more efficiently transmit power embedded with data. The TX coil portions 300a~n of the external module 2 and the RX coil portions 301a~n of the display apparatus 1 may include the plurality of coils, respectively.

Since the power is wirelessly transmitted through the respective coils 300a~n and 301a~n, data of n bits can be transmitted between the external module 2 and the display apparatus 1 in accordance with the number of coils 300a~n and 301a~n. For example, if the coil 300a and the coil 300c of the external module 2 are used in transmitting HI electric currents of iTa and iTc and the coil 300b and the coil 300d are used in transmitting LOW electric currents of iTb and iTd, the display apparatus 1 may receive a data packet of [1010] based on the levels of electric currents iDa, iDb, iDc and iDd induced in the respectively corresponding coils 301a~d. If 8 pairs of coils are used, it is possible to transmit data of 8 bits together with the power to be wirelessly transmitted In other words, the external module 2 can provide more various pieces of data embedded in the power to the display apparatus 1 as the number of coils increases. Then, the electric currents iDa~n received in the plurality of coils are combined and rectified in the rectifier 400, and transmitted as power to the elements of the display apparatus 1.

FIG. 16 illustrates only blocks related to power transmission between the external module 2 and the display apparatus 1 while omitting the other elements.

As described above, the external module 2 may use the communicator 201 in transmitting various pieces of data such as a message, an image, etc. to the display apparatus 1. However, in this example embodiment, the power to be wirelessly transmitted may be modulated so as to embed data therein. The external module 2 may include the first 1modulator/demodulator 1600 for modulating power based on an image signal, and the TX coil portion 300 for wirelessly transmitting the modulated power to the display apparatus 1. The TX coil portions 300a~n may include a plurality of coils each corresponding to one bit of data.

The display apparatus 1 wirelessly receives power from the external module 2, extracts data by demodulating the modulated power, and displays a message, an image or the like based on the extracted data. The display apparatus 1 may include the RX coil portion 301 for wirelessly receiving power, and the second modulator/demodulator 1601 for extracting data by demodulating the received power. The RX coil portions 301a~n may include a plurality of coils each corresponding to one bit of data. If the power is modulated by AM, the second modulator/demodulator 1601 uses envelop detection for the demodulation and decodes a detected signal into data. Such a demodulation process includes sensing whether the electric current or voltage is a HI or LOW state, and detecting data based on the sensed state.

FIG. 17 is a flowchart illustrating an example of controlling a display apparatus according to an example embodiment.

At operation S1700, the wireless power receiver 200 wirelessly receives power from the external module 2. At operation S1701, the display 100 displays an image based on a received image signal. At operation S1702, the communicator 201 communicates with the external module 2. At operation S1703, the information acquirer 101 acquires information about a distance between the display apparatus and a user. At operation S1704, the controller 203 controls the communicator 201 to determine the consumption power of the display apparatus and transmit the determined information to the external module 2. At operation S1704, the controller 203 determines whether a user is within the critical range 10 from the display apparatus 1, based on the acquired information. If a user is within the critical range 10 from the display apparatus 1, the controller 203 performs the control operations for reducing the consumption power of the display apparatus 1. If a user is out of the critical range 10 from the display apparatus 1, the controller 203 keeps normal operations.

As described above, according to an example embodiment, the power to be wirelessly transmitted is decreased in level or cut off if a user comes within a predetermined range from the display apparatus, thereby protecting a user's body.

Although various example embodiments have been illustrated and described, it will be appreciated by those skilled in the art that changes may be made in these example embodiments without departing from the principles and spirit of the disclosure, the scope of which is defined in the appended claims and their equivalents.

What is claimed is:

1. A display system comprising:
    a display apparatus comprising:
        a wireless power receiver configured to wirelessly receive power from an external power source;
        a display comprising a display panel configured to display an image based on a received image signal, and a backlight configured to emit light toward the display panel;
        a first communication circuitry configured to communicate with the external power source;
        a sensor configured to detect a distance between the display apparatus and a user; and
        a first controller configured to:

control the backlight to emit the light based on the received power, and transmit information on the detected distance to the external power source if it is determined that the user is within a predetermined critical distance from the display apparatus, and the external power source comprising:
a wireless power transmitter configured to wirelessly transmit the power to the display apparatus,
a second communication circuitry configured to communicate with the display apparatus, and
a second controller configured to, in response to receiving the information on the detected distance from the display apparatus, adjust a level of the power to correspond to the detected distance, and control the wireless power transmitter to transmit the power having the adjusted level to the display apparatus,
wherein the first controller is further configured to control the backlight to emit the light based on the received power having the adjusted level for reducing power consumption.

2. The display system according to claim 1, wherein the first controller is configured to detect data based on change in the level of power transmitted from the external power source, and to control the display to display the image based on the detected data.

3. The display system according to claim 1, wherein the first controller is configured to control at least one of: brightness of the display, a sound output from a loudspeaker, and quality of the image displayed on the display, to reduce the power consumption of the display apparatus.

4. The display system according to claim 1, further comprising a battery provided in the display apparatus configured to selectively supply power to the display apparatus,
wherein the first controller is configured to charge the battery with power supplied from the wireless power receiver, to control the first communication circuitry to request that the external power source cut off the power transmission if it is determined that the user is within the predetermined critical distance, and to control the battery to supply the power if the wireless power receiver receives no power from the external power source.

5. The display system according to claim 1, wherein the first controller is configured to reduce the power consumption if a preset first critical time has elapsed after it is determined that a body part of the user is within the predetermined critical distance.

6. The display system according to claim 5, wherein the first controller is configured to determine whether the user is moving within the predetermined critical distance, and to reduce the power consumption if it is determined that the user is moving and the movement lasts for more than a second critical time.

7. The display system according to claim 6, wherein the first controller is configured to determine whether the user is moving away from the display apparatus or whether the user is not moving away from the display apparatus, and if it is determined that the user is not moving away from the display apparatus to reduce the power consumption if the movement lasts for more than a third critical time.

8. The display system according to claim 1, wherein the first controller is configured to reduce the power consumption based on the detected distance between the user and the display apparatus.

9. The display system according to claim 1, wherein the first controller is configured to control the display to display the detected distance between the user and the display apparatus.

10. The display system according to claim 1, wherein the first controller is configured to control the display to display a user interface (UI) comprising at least one menu item, to store setup information about the power consumption based on inputs received using the menu item of the user interface, and to reduce the power consumption based on the stored setup information.

11. A method of controlling a display system including an external power source and a display apparatus comprising a display, the display comprising a display panel configured to display an image based on a received image signal and a backlight configured to emit a light to the display panel, the method comprising:
wirelessly receiving, by the display apparatus, power from the external power source;
emitting, by the display apparatus, a light based on the received power to the display panel based on the received power,
transmitting, by the display apparatus, information on a distance between the display apparatus and a user to the external power source if it is determined that the user is within a predetermined critical distance from the display apparatus, the distance being detected by a sensor of the display apparatus,
in response to receiving the information on the detected distance from the display apparatus, adjusting, by the external power source, a level of the power to correspond to the detected distance, and transmitting the power having the adjusted level to the display apparatus, and
wherein the emitting, by the display apparatus, the light comprises emitting the light based on the received power having the adjusted level for reducing power consumption.

12. The method according to claim 11, wherein the wirelessly receiving the power comprises: detecting data based on change in the level of power transmitted from the external power source, and displaying the image based on the detected data.

13. The method according to claim 11, further comprising: controlling at least one of: brightness of the display, a sound output from a loudspeaker, and quality of the image displayed on the display for reducing the power consumption.

14. The method according to claim 11, further comprising:
charging a battery with power received from the external power source; and
making a request to the external power source to cut off the power transmission if it is determined that the user is within the predetermined critical distance, and controlling the battery to selectively supply power if no power is received from the external power source.

15. The method according to claim 11, further comprising reducing the power consumption if a preset first critical time has elapsed after it is determined that a body part of the user is within the predetermined critical distance.

16. The method according to claim 15, wherein the reducing the power consumption of the display apparatus comprises:
determining whether the user is moving; and reducing the power consumption if it is determined that the user is moving and the movement lasts for more than a second critical time.

17. The method according to claim 16, wherein the reducing the power consumption of the display apparatus comprises:

determining whether the user is moving away from the display apparatus or whether the user is not moving away from the display apparatus if it is determined that the user is moving; and reducing the power consumption if the user is not moving away from the display apparatus and the movement lasts for more than a third critical time.

18. The method according to claim 11, wherein the reducing the power consumption of the display apparatus comprises: reducing the power consumption based on the distance between the user and the display apparatus.

19. The method according to claim 11, further comprising: displaying the distance between the user and the display apparatus.

20. The method according to claim 11, further comprising:

displaying a user interface (UI) comprising at least one menu item;

storing setup information about the power consumption based on inputs received using the menu item of the user interface; and reducing the power consumption based on the stored setup information.

\* \* \* \* \*